US012665103B2

(12) United States Patent
Yamaguchi et al.

(10) Patent No.: US 12,665,103 B2
(45) Date of Patent: Jun. 23, 2026

(54) INSULATED WIRE, COIL USING INSULATED WIRE, VARIABLE-THICKNESS INSULATING TAPE USED IN MANUFACTURE OF INSULATED WIRE, AND MANUFACTURING METHOD OF SAME

(71) Applicant: TOTOKU ELECTRIC CO., LTD., Tokyo (JP)

(72) Inventors: Tadashi Yamaguchi, Ueda (JP); Shigeo Hayashi, Ueda (JP)

(73) Assignee: TOTOKU ELECTRIC CO., LTD., Tokyo (JP)

( * ) Notice: Subject to any disclaimer, the term of this patent is extended or adjusted under 35 U.S.C. 154(b) by 864 days.

(21) Appl. No.: 17/909,240

(22) PCT Filed: Dec. 24, 2020

(86) PCT No.: PCT/JP2020/048544
§ 371 (c)(1),
(2) Date: Sep. 2, 2022

(87) PCT Pub. No.: WO2021/176816
PCT Pub. Date: Sep. 10, 2021

(65) Prior Publication Data

US 2023/0099218 A1 Mar. 30, 2023

(30) Foreign Application Priority Data

Mar. 3, 2020 (JP) ................................ 2020-035619
Jul. 21, 2020 (JP) ................................ 2020-124158

(51) Int. Cl.
*H01B 7/02* (2006.01)
*H01F 5/06* (2006.01)
*H01F 41/12* (2006.01)

(52) U.S. Cl.
CPC ................ *H01B 7/02* (2013.01); *H01F 5/06* (2013.01); *H01F 41/12* (2013.01)

(58) Field of Classification Search
CPC ........... H01B 3/00; H01B 7/02; H01B 7/0241
See application file for complete search history.

(56) References Cited

U.S. PATENT DOCUMENTS 471,588 A * 3/1892 Williams
3,280,847 A * 10/1966 Chisholm .............. B29C 48/06 174/28

(Continued)

FOREIGN PATENT DOCUMENTS

CN 104919679 A 9/2015
JP 2008-236924 A 10/2008

(Continued)

OTHER PUBLICATIONS

International Search Report issued Mar. 2, 2021 in International Application No. PCT/JP2020/048544.

(Continued)

*Primary Examiner* — Chau N Nguyen
(74) *Attorney, Agent, or Firm* — Sughrue Mion, PLLC

(57) ABSTRACT

To provide an insulated wire that can increase in a partial discharge starting voltage, prevent deterioration of an insulator, and not cause worsening of an occupancy ratio, a coil that uses the insulated wire, a variable-thickness insulating tape used in manufacture of the insulated wire, and a manufacturing method of the same. The above-described problem is solved by an insulated wire (10) for a coil, comprising a conductor (1), and insulating coatings (2, 3) provided on an outer periphery of the conductor (1). The insulated wire (10) is constituted by the thick insulating coating (3) for an area where voltage increases and partial discharge readily occurs, and the thin insulating coating (2) for an area where the voltage does not increase and partial (Continued)

10(10B)

discharge does not readily occur, when the coil is wound. The thick insulating coating (3) and the thin insulating coating (2) are repeatedly provided at desired intervals. The above-described problem is solved by a coil (40) obtained by winding such an insulated wire (10) and configured so that the insulating coating (3) of the insulated wire (10) in an area where partial discharge readily occurs is thick, and the insulating coating (2) of the insulated wire (10) in an area where partial discharge does not readily occur is thin.

8 Claims, 15 Drawing Sheets

(56) References Cited

U.S. PATENT DOCUMENTS

| | | | | |
|---|---|---|---|---|
| 10,647,270 | B2 * | 5/2020 | Yanazawa | H01B 7/184 |
| 2002/0017392 | A1 * | 2/2002 | Efraimsson | H01F 5/06 174/110 R |
| 2008/0231136 | A1 | 9/2008 | Obata | |
| 2014/0265711 | A1 | 9/2014 | Koshino et al. | |
| 2015/0364977 | A1 | 12/2015 | Hattori | |
| 2016/0329770 | A1 | 11/2016 | Ishii et al. | |

FOREIGN PATENT DOCUMENTS

| | | | |
|---|---|---|---|
| JP | 2010-062496 | * | 3/2010 |
| JP | 2010-177075 | A | 8/2010 |
| JP | 2012-209391 | A | 10/2012 |
| JP | 2013-183513 | A | 9/2013 |
| JP | 2015-138678 | A | 7/2015 |

OTHER PUBLICATIONS

Written Opinion of the International Searching Authority issued Mar. 2, 2021 in International Application No. PCT/JP2020/048544.

* cited by examiner

INSULATED WIRE, COIL USING INSULATED WIRE, VARIABLE-THICKNESS INSULATING TAPE USED IN MANUFACTURE OF INSULATED WIRE, AND MANUFACTURING METHOD OF SAME

CROSS REFERENCE TO RELATED APPLICATIONS

This application is a National Stage of International Application No. PCT/JP2020/048544 filed Dec. 24, 2020, claiming priority based on Japanese Patent Application 2020-035619 filed Mar. 3, 2020 and Japanese Patent Application No. 2020-124158 filed Jul. 21, 2020.

FIELD OF THE INVENTION

The present invention relates to an insulated wire in which a thickness of an insulating coating can be changed as desired to increase a partial discharge (corona discharge) starting voltage, a coil that uses the insulated wire, a variable-thickness insulating tape used in manufacture of the insulated wire, and a manufacturing method of the same.

BACKGROUND ART

Insulated wires are used in various products. In a case in which an insulated wire is used as a winding for a coil or the like of a rotating electrical device such as a motor, the insulated wire is used with high voltage applied. At this time, a severe partial discharge (corona discharge) may occur on an insulation-coated surface. Such partial discharge is a phenomenon caused by accelerated deterioration of the insulating coating due to local temperature rise and generation of ozone and ions. The occurrence of partial discharge creates the problem of shortening the life of the device in which the component is used.

In recent years, with increasing demand for compact and high-power motors, coils that can increase the applied voltage are in need. However, when the applied voltage is increased, the voltage applied to the coil increases and partial discharge is more likely to occur. In response to such problems, it is desirable to increase the voltage at which partial discharge occurs (referred to as partial discharge starting voltage), and thus, to increase the partial discharge starting voltage, various measures have been taken, such as thickening the insulating coating of an enameled wire, thickening the insulating coating by resin extrusion, and lowering the dielectric constant of the insulating coating by foaming. However, each of these methods result in a decrease in coil winding occupancy and a decrease in film strength, and are thus limited in causing an increase in partial discharge starting voltage.

Partial discharge tends to occur when high voltage is applied to a “crossing part” connecting a stator slot conductor part of the motor (slot conductor part refers to a mode in which wires are arranged in a slot). To solve such problems, Patent Documents 1 and 2, for example, describe the suppression of partial discharge and the like by changing a thickness and a material of the insulating material in the slot conductor part and the crossing part of the insulated wire.

Specifically, Patent Document 1 describes a method of winding and thus forming the conductor in a coil shape, subsequently forming an insulating layer in each portion that becomes the slot conductor part and the crossing part, and changing a thickness of each insulating layer. Further, Patent Document 2 describes a method of making a relative dielectric constant of a portion serving as the crossing part in a length direction of the insulated wire lower than a relative dielectric constant of the portion serving as the slot conductor part by adjusting a total volume of bubbles in the resin forming the insulating layer, and the like.

PRIOR ART DOCUMENTS

Patent Documents

Patent Document 1: Japanese Laid-Open Patent Application Publication No. 2008-236924

Patent Document 2: Japanese Laid-Open Patent Application Publication No. 2015-138678

SUMMARY OF THE INVENTION

Problems to be Solved by the Invention

Nevertheless, to manufacture an insulated wire including an insulating layer that can exhibit insulation performance such as required at the time of coil design, the method of manufacturing the insulated wire such as mentioned above requires significant man-hours and complex processes. Further, it is difficult to manufacture, by enamel baking means or by resin extrusion, an insulated wire including an insulating coating of varying thickness so that insulation performance can be exhibited as required at the time of coil design.

The present invention has been made to solve the above-described problems, and an object thereof is to provide an insulated wire that can be manufactured without significant man-hours or complex processes, increase a partial discharge starting voltage, prevent deterioration of an insulator, and not cause worsening of an occupancy ratio, a coil that uses the insulated wire, a variable-thickness insulating tape used in manufacture of the insulated wire, and a manufacturing method of the same.

Means for Solving the Problems (1) An insulated wire according to the present invention is an insulated wire comprising a conductor, and an insulating coating provided on an outer periphery of the conductor, and is constituted by a thick insulating coating and a thin insulating coating, and the thick insulating coating and the thin insulating coating are repeatedly provided at desired intervals.

According to this invention, the thick insulating coating and the thin insulating coating are repeatedly provided at desired intervals, and thus, for example, the insulating coating can be thickened in an area where partial discharge readily occurs and in an area where high withstand voltage is required. As a result, for example, it is possible to increase the partial discharge starting voltage at a crossing part, or increase the withstand voltage in an area where high withstand voltage is required. Further, for example, the insulating coating can be thinned in a slot conductor part and in an area where the withstand voltage does not need to be so high, making it possible to improve and not worsen the occupancy ratio. These areas are repeatedly provided at desired intervals, and thus, for example, in a case in which the coil is preferably applied as a coil for a three-phase induction motor, the thin insulating coating can be set in the slot conductor part of the motor, and the thick insulating coating can be set in an area where high voltage of the crossing part connecting the slot conductor part of the motor is applied.

In the insulated wire according to the present invention, the thick insulating coating and the thin insulating coating are formed by an insulating tape including a thick region and a thin region at predetermined intervals (hereinafter referred to as "variable-thickness insulating tape") being wound on the outer periphery of the conductor. According to this invention, the above-described variable-thickness insulating tape is wound on the outer periphery of the conductor, thereby making it possible to create an insulated wire in which a thick insulating coating and a thin insulating coating are repeatedly provided at desired intervals.

In the insulated wire according to the present invention, the thick insulating coating and the thin insulating coating are configured to have different visibilities. According to this invention, by making the visibilities different depending on the thickness of the insulating coating, it is possible to distinguish the thick insulating coating from the thin insulating coating. This makes it possible for a worker, a discrimination sensor, or the like to discriminate between the thin insulating coating and the thick insulating coating during coil fabrication, and thus make the coil manufacturing process easier.

In the insulated wire according to the present invention, the variable-thickness insulating tape is constituted by a base material tape and a bonding tape bonded onto one main surface of the base material tape, or is constituted by a base material tape, a bonding tape bonded onto one main surface of the base material tape, and a cover tape further bonded onto the bonding tape so as to cover the bonding tape. According to this invention, the variable-thickness insulating tape can have a simple structure constituted by the base material tape and the bonding tape, or a so-called sandwich structure constituted by the base material tape, the bonding tape, and the cover tape.

In the insulated wire according to the present invention, the variable-thickness insulating tape further includes an adhesive layer formed on the one main surface of the base material tape and on the bonding tape or on the other main surface of the base material tape. The variable-thickness insulating tape initially wound on the outer periphery of the conductor is wound with the adhesive layer being on the conductor side serving as an inside or on an outside, and another variable-thickness insulating tape further provided thereon is wound with the bonding tape surface side being on the inside and the adhesive layer being on the inside. According to this invention, the other main surface on the flat surface side of the base material tape can be firmly adhered to the conductor. It should be noted that, in the case of further winding in layers, another variable-thickness insulating tape further provided on the variable-thickness insulating tape is wound with the bonding tape surface side being on the inside and the adhesive layer also being on the inside, thereby making it possible to make an appearance of the insulating coating uniform and smooth. This has the effect of preventing the insulated wire from snagging on a jig used during processing, such as in a case of manufacturing a coil with an insulated wire, thereby making it possible to suppress the occurrence of scratches during processing. Further, easy peeling of the insulating coating can be realized by winding the variable-thickness insulating tape initially wound on the outer periphery of the conductor with the adhesive layer being on the outside.

In the insulated wire according to the present invention, the variable-thickness insulating tape is wound on the outer periphery of the conductor, another variable-thickness insulating tape or a constant-thickness insulating tape is further wound on an outer periphery of the variable-thickness insulating tape, and the thick insulating coating and the thin insulating coating are repeated. According to this invention, it is possible to obtain an insulated wire in which a plurality of the variable-thickness insulating tapes are wound to further thicken the thick insulating coating and increase the withstand voltage, or an insulated wire in which the constant-thickness insulating tape is further wound to thicken the thin insulating coating and adjust the occupancy ratio.

In the insulated wire according to the present invention, in a case in which the variable-thickness insulating tape is wound and then another variable-thickness insulating tape is further wound thereon, the other variable-thickness insulating tape is wound in a layer so that a thick region thereof overlaps the thick insulating coating already formed. According to this invention, the other variable-thickness insulating tape is wound in a layer so that the thick region thereof overlaps the thick insulating coating already formed, thereby making it possible to further thicken the thick insulating coating.

In the insulated wire according to the present invention, in a case in which the variable-thickness insulating tape is wound and then another variable-thickness insulating tape or a constant-thickness insulating tape is further wound in a layer thereon, the other variable-thickness insulating tape or the constant-thickness insulating tape is wound in a layer in a winding direction different from that of the variable-thickness insulating tape. According to this invention, in a case in which a plurality of insulating tapes are wound in layers, these insulating tapes are wound in layers in different winding directions, thereby making it possible to make the insulating coating thickness uniform and the surface smooth. This has the effect of preventing the insulated wire from snagging on a jig used during processing, such as in a case of manufacturing a coil with an insulated wire, thereby making it possible to suppress the occurrence of scratches during processing.

In the insulated wire according to the present invention, the thick insulating coating has a tapered part at both end parts thereof. According to this invention, the tapered part of the thick insulating coating can smoothly change the thick insulating coating to the thin insulating coating, resulting in the effect of preventing the insulated wire from snagging on a jig used during processing, such as in a case of manufacturing a coil with an insulated wire, thereby making it possible to suppress the occurrence of scratches during processing.

In the insulated wire according to the present invention, preferably the tapered part has a taper ratio from 0.5/1000 to 150/1000. By keeping the taper ratio within this range, it is possible to obtain an appropriate insulation thickness and exhibit favorable insulation characteristics.

In this case, the thick insulating coating and the thin insulating coating are formed by the variable-thickness insulating tape, including the thick region and the thin region at a predetermined interval, being wound on the outer periphery of the conductor, and the variable-thickness insulating tape has a boundary line between the thick region and the thin region obliquely formed with respect to a longitudinal direction of the variable-thickness insulating tape. According to this invention, it is possible to reduce abrupt changes in an outer diameter of the insulated wire around which the boundary line portion of the variable-thickness insulating tape is wound. As a result, the amount of change in the outer diameter is reduced, thereby making it possible to smoothen the surface. This has the effect of preventing the insulated wire from snagging on a jig used during processing, such as in a case of manufacturing a coil with an insulated wire, thereby making it possible to suppress the occurrence of scratches during processing.

In the insulated wire according to the present invention, given θ1 as a winding angle of the variable-thickness insulating tape with respect to a longitudinal direction of the conductor, θ2 as an angle of the boundary line between the thick region and the thin region with respect to the longitudinal direction of the variable-thickness insulating tape, and θ3 as an angle between the boundary line of the variable-thickness insulating tape and the longitudinal direction of the conductor, the θ1 is within a range from 10° to 60°, the θ2 is within a range from 10° to 90°, and the variable-thickness insulating tape is wound in a direction in which the θ2 is greater than the θ3. In particular, preferably the θ3 is 0°.

In the insulated wire according to the present invention, an extruded resin layer is further provided as an insulating outer coating.

(2) A coil according to the present invention is a coil obtained by winding the insulated wire according to the above-described present invention. The insulated wire includes a portion provided with the thick insulating coating, and a portion provided with the thin insulating coating. The thick insulating coating and the thin insulating coating are repeatedly provided at desired intervals.

According to this invention, a coil is obtained by winding the insulated wire repeatedly provided with the thick insulating coating and the thin insulating coating at desired intervals, thereby making it possible to use an insulated wire in which the insulating coating is thickened in an area where partial discharge readily occurs and in an area where high withstand voltage is required, for example. As a result, for example, it is possible to obtain a coil that increases the partial discharge starting voltage at a crossing part, or increases the withstand voltage in an area where high withstand voltage is required. Further, for example, it is possible to use the insulated wire obtained by thinning the insulating coating in a slot conductor part and in an area where the withstand voltage does not need to be so high, for example, and thus improve without worsen the occupancy ratio.

In this coil, preferably the insulating coating of the insulated wire in an area where voltage increases and partial discharge readily occurs is a thick insulating coating, and the insulating coating of the insulated wire in an area where voltage does not increase and partial discharge does not readily occur is a thin insulating coating. According to this invention, the insulating coating of the insulated wire in an area where partial discharge readily occurs is thick, thereby making it possible to, for example, increase the partial discharge starting voltage at the crossing part, and the insulating coating in an area where partial discharge does not readily occur is thin, thereby making it possible to improve without worsen the occupancy ratio. These areas are repeatedly provided at desired intervals, and thus, for example, in a case in which the coil is preferably applied as a coil for a three-phase induction motor, the thin insulating coating can be set in the slot conductor part of the motor, and the thick insulating coating can be set in an area where high voltage of the crossing part connecting the slot conductor part of the motor is applied.

(3) A variable-thickness insulating tape according to the present invention comprises an insulator, and a thin portion and a thick portion are repeated. According to this invention, by winding such a variable-thickness insulating tape on the outer periphery of the conductor, it is possible to form an insulating coating composed of a thick portion and a thin portion on the outer periphery of the conductor.

In the variable-thickness insulating tape according to the present invention, a thickness of the thick portion is 1.5 times to 8 times a thickness of the thin portion. According to this invention, the thickness of the thick portion of the variable-thickness insulating tape is within the above-described range, thereby making it possible to obtain an insulating coating that has high work efficiency when the variable-thickness insulating tape is wound on the outer periphery of the conductor, and has a sufficient difference in thickness.

In the variable-thickness insulating tape according to the present invention, the thick portion is colored. According to this invention, the thick portion can be easily recognized during tasks such as wrapping the variable-thickness insulating tape. Further, when the variable-thickness insulating tape is wound on the outer periphery of the conductor, the thick portion of the insulating coating formed on the outer periphery of the conductor may be a colored portion.

In the variable-thickness insulating tape according to the present invention, the thin portion is constituted by a base material tape, and the thick portion is constituted by the base material tape and a bonding tape bonded onto one main surface of the base material tape. According to this invention, it is possible to adopt a simple structure that does not require complex processes.

In the variable-thickness insulating tape according to the present invention, the thin portion is configured by layering a base material tape and a cover tape, and the thick portion is constituted by a bonding tape interposed between the base material tape and the cover tape and bonded onto one main surface of the base material tape. According to this invention, it is possible to adopt a simple structure that does not require complex processes and, furthermore, with use of the cover tape, improve a wrappability when winding on the outer periphery of the conductor.

In the variable-thickness insulating tape according to the present invention, the bonding tape is colored. According to this invention, it is possible to color the thick portion of the variable-thickness insulating tape with a simple structure that does not require complex processes.

In the variable-thickness insulating tape according to the present invention, the base material tape and the bonding tape are constituted by insulating materials having heat-resistant temperatures of the same level. According to this invention, it is possible to make the heat-resistant temperature of the variable-thickness insulating tape uniform, which is preferable in terms of heat resistance of an entire wire in a case of use as the insulating coating of an insulated wire.

In the variable-thickness insulating tape according to the present invention, a boundary line between the thick portion and the thin portion is obliquely formed with respect to a longitudinal direction of the variable-thickness insulating tape. According to this invention, when the variable-thickness insulating tape is wrapped around a conductor, it is possible to reduce the abrupt change in the outer diameter of the insulated wire in which a boundary portion in which the thickness of the variable-thickness insulating tape changes is wound. As a result, the amount of change in the outer diameter is reduced, thereby making it possible to smoothen the surface.

The variable-thickness insulating tape according to the present invention functions as an insulating coating provided on an outer periphery of a conductor constituting an insulated wire.

(4) A method of manufacturing a variable-thickness insulating tape according to the present invention is a method of manufacturing a variable-thickness insulating tape including an insulator and a thin portion and a thick portion repeatedly provided thereto, and is any one of the following (a) to (d): (a) a method of temporarily adhering a bonding base tape serving as the thick portion on a base material tape serving as the thin portion, removing the bonding base tape in a predetermined shape, and then using a remaining portion of the bonding base tape as the thick portion; (b) a method of bonding a bonding tape serving as the thick portion formed into a predetermined shape to a base material tape serving as the thin portion; (c) a method of bonding the bonding tape serving as the thick portion slit to a predetermined width to a base material tape serving as the thin portion and cutting the bonding tape thus bonded, or simultaneously cutting the bonding tape with a heating press that performs bonding; and (d) a method of temporarily adhering a bonding base tape serving as the thick portion on a process tape, removing the bonding base tape in a predetermined shape, using a remaining portion of the bonding base tape as the thick portion, bonding a base material tape serving as the thin portion onto the second tape serving as the thick portion, and lastly removing the process tape.

According to this invention, it is possible to manufacture a variable-thickness insulating tape including a base material tape composed of a thin portion and a bonding tape composed of a thick portion bonded on one main surface of the base material tape via an adhesive layer.

The method of manufacturing a variable-thickness insulating tape according to the present invention further comprises a process of bonding a cover tape onto the bonding tape. According to this invention, it is possible to adopt a sandwich structure including a cover tape that covers the bonding tape in its entirety via an adhesive layer on the bonding tape.

Effect of the Invention

According to the present invention, it is possible to provide an insulated wire that can increase a partial discharge starting voltage, prevent deterioration of an insulator, and not cause worsening of an occupancy ratio, and a coil for a motor fabricated with the insulated wire. Further, according to the present invention, it is possible to provide a variable-thickness insulating tape used in the fabrication of an insulated wire constituted by a thick insulating coating and a thin insulating coating, and a manufacturing method of the same.

EMBODIMENTS OF THE INVENTION

Figure 1A:
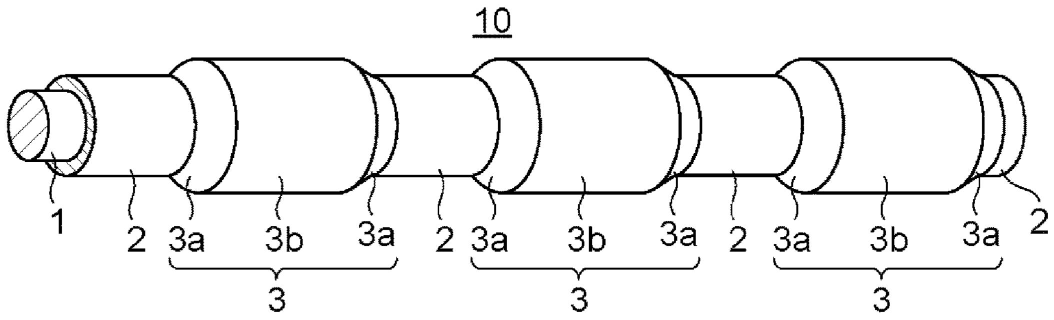
FIGS. 1A and 1B are perspective views illustrating an example of an insulated wire according to the present invention.

An insulated wire, a coil, a variable-thickness insulating tape, and a manufacturing method thereof according to the present invention will now be described with reference to the drawings. It should be noted that the present invention can be modified in various ways as long as the technical features set forth herein are present, and is not limited to forms of the descriptions and drawings below.

[Insulated Wire]

An insulated wire 10 according to the present invention, as illustrated in FIGS. 1A and 1B and FIG. 5 to FIG. 8, includes a conductor 1, and insulating coatings 2, 3 provided on an outer periphery of the conductor 1, and is constituted by the thick insulating coating 3 for an area where voltage increases and partial discharge readily occurs, and the thin insulating coating 2 for an area where the voltage does not increase and partial discharge does not readily occur, when the coil is wound. The thick insulating coating 3 and the thin insulating coating 2 are repeatedly provided at desired intervals. A coil 40 obtained by winding such an insulated wire 10 is configured so that the insulating coating 3 of the insulated wire 10 in an area where voltage increases and partial discharge readily occurs is thick, and the insulating coating 2 of the insulated wire 10 in an area where voltage does not increase and partial discharge does not readily occur is thin, as illustrated in the coil configuration extended view of FIG. 13.

In the insulated wire 10 according to the present invention, the insulating coating 3 of the insulated wire in an area where partial discharge readily occurs is thick, thereby making it possible to, for example, increase the partial discharge starting voltage at a crossing part, and the insulating coating 2 of the insulated wire in an area where partial discharge does not readily occur is thin, thereby making it possible to improve without worsen an occupancy ratio. These areas are repeatedly provided at desired intervals, and thus, for example, in a case in which the coil is preferably applied as the coil 40 for a three-phase induction motor, the thin insulating coating 2 can be set in a slot conductor part of the motor, and the thick insulating coating 3 can be set in an area where high voltage of the crossing part connecting the slot conductor part of the motor is applied. As a result, it is possible to provide an insulated wire that can increase a partial discharge starting voltage, prevent deterioration of an insulator, and not cause worsening of an occupancy ratio, and a coil for a motor fabricated with the insulated wire.

In the following, each component will be described.

(Conductor)

The conductor 1 is not particularly limited as long as applied as a center conductor of the insulated wire 10, especially for a coil, and may be any type of conductor, regardless of material and twist configuration. For example, the conductor 1 may be constituted by a single strand extending in a longitudinal direction, may be constituted by several strands twisted together, or may be configured as a litz wire. The type of strand is not particularly limited as long as a good conductive metal, but preferable examples include a metal conductor having favorable conductivity, such as copper wire, copper alloy wire, aluminum wire, aluminum alloy wire, copper-aluminum composite wire, or any of these wires with a plating layer on a surface thereof. Copper wire and copper alloy wire are particularly preferred from the standpoint of coil use. As the plating layer, a solder plating layer, a tin plating layer, a gold plating layer, a silver plating layer, a nickel plating layer, or the like is preferred. Furthermore, a "conductor" or a "strand" covered with an enamel layer or the like for insulation, oxidation prevention, or the like are also included as a conductor and a strand in the present invention. A cross-sectional shape of the strand is also not particularly limited and, in the wire material thereof, may be a circular or substantially circular shape or may be a rectangular shape.

A cross-sectional shape of the conductor 1 is also not particularly limited, and may be a circular shape (including elliptical shape) or may be a rectangular shape or the like. A cross-sectional size of the conductor 1 is desirably as large as possible so that an electric resistance (alternating-current resistance, conductor resistance) is reduced to such an extent that the conductor 1 can be preferably used for coils, and examples thereof include an outer diameter of a circular strand of about 0.05 to 4 mm. Further, in the case of a rectangular strand, examples include a short side of about 0.3 to 5 mm and a long side of about 0.5 to 10 mm. A cross-sectional size of these conductors 1 is selected as appropriate depending on the application in which the coil is used, but the smaller this cross-sectional size, the higher the adhesion and the positioning accuracy required in the insulating coatings 2, 3 described below.

(Insulating Coating)

Figure 1B:
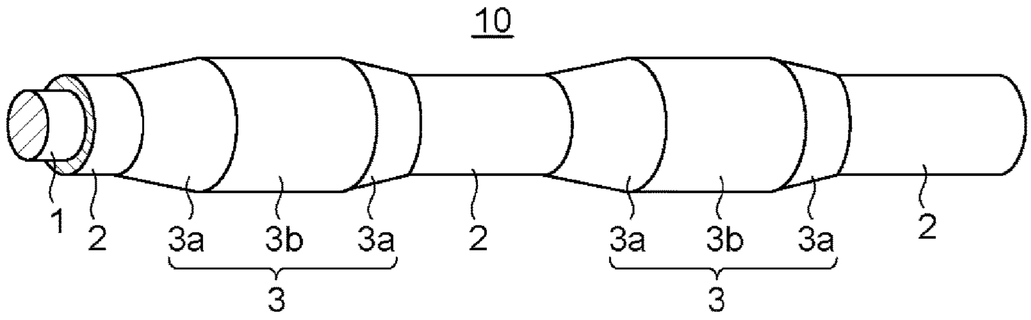

The insulating coatings 2, 3, as illustrated in FIGS. 1A and 1B, are provided on the outer periphery of the conductor 1. The insulating coating is constituted by the thick insulating coating 3 for an area where voltage increases and partial discharge readily occurs, and the thin insulating coating 2 for an area where the voltage does not increase and partial discharge does not readily occur, when the coil is wound, and these are repeatedly provided at desired intervals. The insulating coating 3 in an area where partial discharge readily occurs can, for example, increase the partial discharge starting voltage at the crossing part, and the insulating coating 2 in an area where partial discharge does not readily occur can improve without worsen the occupancy ratio, for example.

Materials of the insulating coatings 2, 3 are not particularly limited, and, for example, materials used in insulating tapes, such as polyethylene resin, polyester resin (polyethylene terephthalate (PET), polyethylene naphthalate (PEN), and the like), polyimide resin, polyamide resin, polyamide-imide resin, polystyrene resin, polyphenylene sulfide resin, and polyether ether ketone (PEEK) can be preferably applied. Further, materials having conductivity such as aluminum foil, copper foil, or metal foil obtained by plating these with tin, nickel, gold, or other plating may be used. Furthermore, the material may be, among these resin materials as well, a fluorine-based resin with a low dielectric constant, such as perfluoroalkoxy alkane (PFA), ethylene tetrafluoro ethylene (ETFE), or fluorinated ethylene propylene (FEP) used as a dielectric material, or may be polyphenylene ether resin, polyolefin resin such as polypropylene, polyester resin, polyacrylic resin, or the like.

The thin insulating coating 2 preferably has a thickness within a range from 2 to 500 μm, and the thick insulating coating 3 preferably has a thickness thicker than that of the thin insulating coating 2 and within a range from 4 to 1000 μm. The respective thicknesses are set in correspondence with the characteristics of the coil in which the insulated wire 10 is to be used. Desirably, the thin insulating coating 2 has at least a thickness that satisfies the required withstand voltage, and normally preferably has a thickness of 2 μm or greater. On the other hand, desirably, the thick insulating coating 3 has at least a thickness that satisfies a withstand voltage to a level capable of increasing the required partial discharge starting voltage, and normally preferably has a thickness of 4 μm or greater. It should be noted that the thickness of the thick insulating coating 3 is 1.5 times to 8 times, preferably from 2 times to 7 times, the thickness of the thin insulating coating 2.

The insulating coatings 2, 3 preferably have visibilities different from each other. Specifically, the visibilities can be made different by changing a color, a pattern, an unevenness, or the like of each of the insulating coatings 2, 3. By making the insulating coatings 2, 3 have different visibilities from each other, it is possible to distinguish the thick insulating coating 3 from the thin insulating coating 2. This makes it possible for a worker, a discrimination sensor, or the like to discriminate between the thin insulating coating 2 and the thick insulating coating 3 during coil fabrication, and thus make the coil manufacturing process easier. It should be noted that a form in which the color of the thick insulating coating 3 is darker than the color of the thin insulating coating 2, or a form in which the thick insulating coating 3 is colored and the thin insulating coating 2 is not colored, is preferred in terms of easiness of the manufacturing process in a case of using a variable-thickness insulating tape 20 described below.

Between the thin insulating coating 2 and a main body part 3*b* of the thick insulating coating 3 is a tapered part 3*a*, as illustrated in FIGS. 1A and 1B. The tapered part 3*a* is formed so that a thickness thereof increases from a boundary portion with the thin insulating coating 2 to a boundary portion of the main body part 3*b*. The thick insulating coating 3 includes the main body part 3*b* and the tapered parts 3*a* at both end parts of the main body part 3*b* of the insulated wire 10 in a longitudinal direction. With the thick insulating coating 3 including the tapered parts 3*a*, an amount of change in an outer diameter of the insulated wire 10 is reduced, thereby making it possible to smoothly change the insulating coating thickness. This has the effect of preventing the insulated wire 10 from snagging on a jig used during processing, such as in a case of manufacturing a coil with the insulated wire 10, thereby making it possible to suppress the occurrence of scratches during processing.

It should be noted that the form illustrated in FIG. 1B is the insulated wire 10 in a case in which a length of the tapered part 3*a* in the longitudinal direction is formed long compared to the form illustrated in FIG. 1A. This way, with the tapered part 3*a* being formed long, the amount of change in the outer diameter of the insulated wire 10 is reduced, thereby making it possible to even more smoothly change the insulating coating thickness.

The tapered part 3*a* has a taper ratio ("difference in taper diameter/length of tapered portion in axial direction") preferably within a range from 0.5/1000 to 150/1000. In a case in which the taper ratio is less than 0.5/1000, the length of the tapered part 3*a* in the axial direction may be too long, making it difficult to obtain an appropriate insulation thickness. Further, in a case in which the taper ratio is greater than 150/1000, the amount of change in the outer diameter from the thin insulating coating 2 to the thick insulating coating 3 is large, which may cause problems in insulation characteristics. The taper ratio is more preferably 1.0/1000 to 100/1000.

(Variable-Thickness Insulating Tape)

Figure 2:
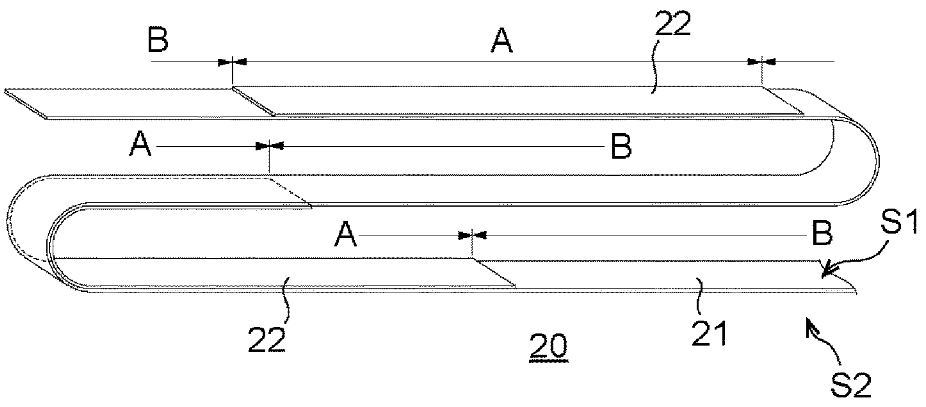
FIG. 2 is a schematic view illustrating an example of a variable-thickness insulating tape.
Figure 3A:
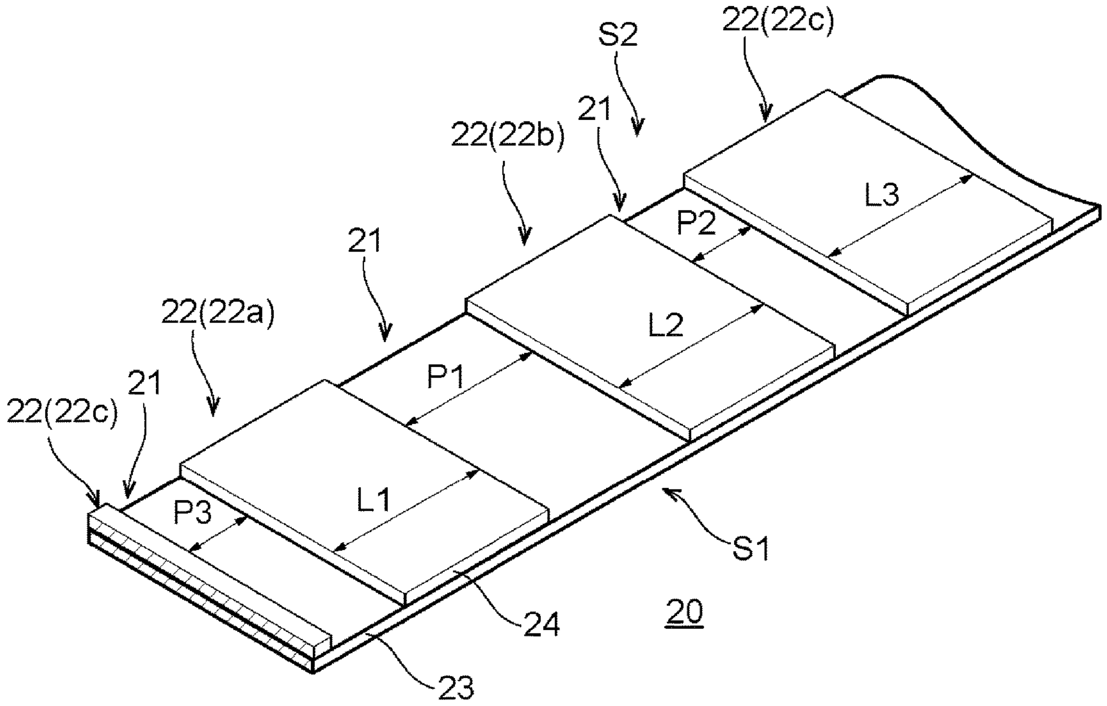
FIGS. 3A and 3B are schematic views for explaining a structure of a thick region and a thin region constituting the variable-thickness insulating tape.
Figure 3B:
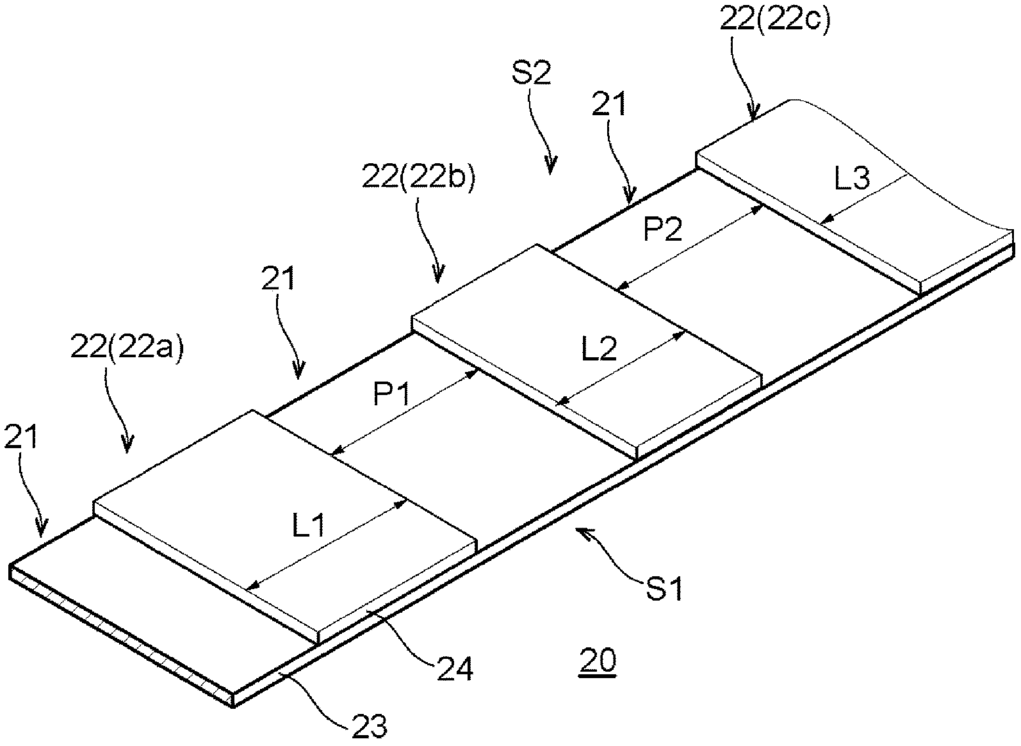

As illustrated in FIG. 2, the variable-thickness insulating tape 20 includes a tape part 21 (also referred to as thin portion 21) serving as a thin region B and a tape part 22 (also referred to as thick portion 22) serving as a thick region A, at a predetermined interval. In other words, the thin portion 21 and the thick portion 22 are repeated. Here, "repeated" means that the thin portion 21 and the thick portion 22 alternate. "Alternate" means that the portions may be repeated at a constant interval (pitch) or may be repeated at an irregular interval that is not constant, as illustrated in FIGS. 3A and 3B. The "predetermined interval" may be within a range from several millimeters to several meters, and can be set as desired in correspondence with the application of the insulated wire.

FIGS. 3A and 3B are schematic views for explaining a structure of the thin portion 21 and the thick portion 22. As illustrated in FIGS. 3A and 3B, the repetition form is not particularly limited, and various forms can be adopted. For example, the example in FIG. 3A is an example in which intervals P1, P2, P3 (also referred to as distances) between thick portions 22*a*, 22*b*, 22*c* are not constant, and the interval P1 between the thick portion 22*a* and the thick portion 22*b* may be set longer than the interval P2 between the thick portion 22*b* and the thick portion 22*c* and the interval P3 between the thick portion 22*c* and the thick portion 22*a*. At this time, lengths L1, L2, L3 of the thick portions 22*a*, 22*b*, 22*c* in the longitudinal direction are constant. Further, the example in FIG. 3B is an example of a case in which the lengths of the thick portions 22*a*, 22*b*, 22*c* in the longitudinal direction are not constant, and the length L1 of the thick portion 22*a* in the longitudinal direction may be set longer than the length L2 of the other thick portion 22*b* in the longitudinal direction. At this time, the interval P1 between the thick portion 22*a* and the thick portion 22*b* and the interval P2 between the thick portion 22*b* and the thick portion 22*c* are constant.

Figure 9A:
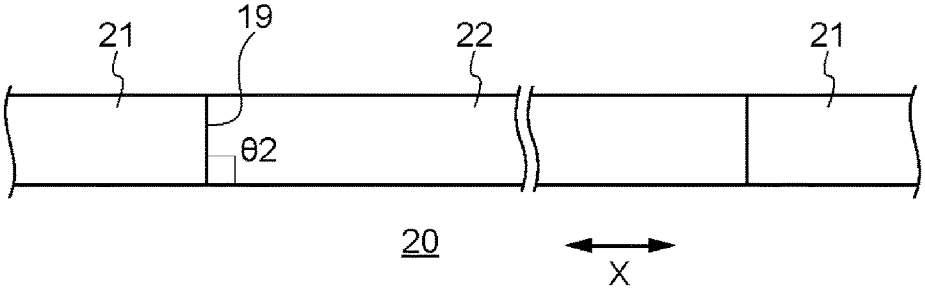
FIGS. 9A and 9B are configuration views illustrating form examples of the insulating tape, FIG. 9A being an example in which a boundary line between the thick region and the thin region is orthogonal to a longitudinal direction of the tape, and FIG. 9B being an example in which the boundary line between the thick region and the thin region is at a predetermined angle θ2 with respect to the longitudinal direction of the tape.
Figure 9B:
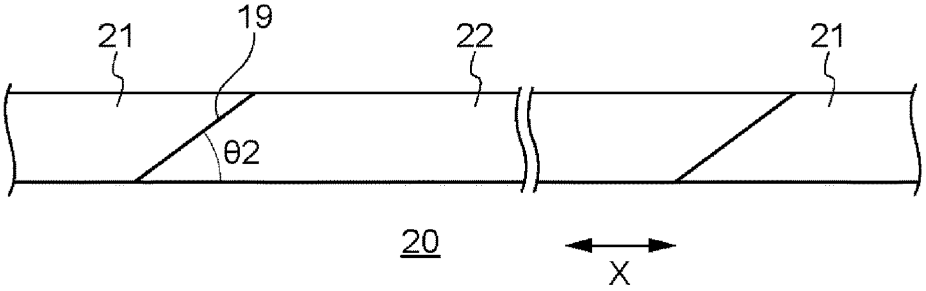

The lengths of the thick portions 22 in the longitudinal direction and/or the intervals between the thick portions 22, as illustrated in FIGS. 3A and 3B, can be set as desired, the interval P1 between the thick portion 22*a* and the thick portion 22*b* can be set to a distance different from that or those of the interval P2 between the thick portion 22*b* and thick portion 22*c* and/or the interval P3 between the thick portion 22*c* and the thick portion 22*a* and, furthermore, the lengths L1, L2, L3 of the thick portions 22*a*, 22*b*, 22*c* in the longitudinal direction can also be set to lengths that are not constant. As a result, for example, it is possible to adjust the position at which the insulating coating is thickened to increase insulation, and thus improve the degree of freedom of design. It should be noted that the thick portion 2 may be provided in a diagonal line shape, as illustrated in FIG. 9B, and the intervals P1, P2 in such a case may be the interval of the thick portions 22 of the tape in a longitudinal direction X.

Such a variable-thickness insulating tape 20 is wound on the outer periphery of the conductor 1 illustrated in FIGS. 1A and 1B, thereby forming the insulating coatings 2, 3 on the outer periphery of the conductor 1 to obtain the insulated wire 10 in which the thin insulating coating 2 and the thick insulating coating 3 are repeatedly provided at desired intervals. Specifically, the tape part 21 illustrated in FIG. 2 is wound on the outer periphery of the conductor 1, thereby forming the thin insulating coating 2, and the tape part 22 is wound on the outer periphery of the conductor 1, thereby forming the thick insulating coating 3.

As for thickness, a thickness of the tape part 22 serving as the thick region A is preferably 1.5 times to 8 times a thickness of the tape part 21 serving as the thin region B. In a case in which the thickness of the tape part 22 is less than 1.5 times the thickness of the tape part 21, the thickness of the thick insulating coating 3 formed by the tape part 22 being wound on the outer periphery of the conductor 1 may not be thick enough to the thin insulating coating 2 formed by the tape part 21 being wound on the outer periphery of the conductor 1. Further, in a case in which the thickness of the tape part 22 exceeds 8 times the thickness of the tape part 21, the variable-thickness insulating tape 20 is likely to fold or wrinkle when the tape part 22 is wound on the outer periphery of the conductor 1, resulting in an uneven appearance when fully wound. It should be noted that the thickness of the tape part 22 serving as the thick region A is preferably 2 times to 7 times the thickness of the tape part 21 serving as the thin region B.

A distance between the tape part 21 serving as the thin region B and the tape part 22 serving as the thick region A is, in a case in which a coil is fabricated with the insulated wire 10 obtained by winding the variable-thickness insulating tape 20 on the outer periphery of the conductor 1, designed in accordance with the degree of interval required between the thin insulating coating 2 and the thick insulating coating 3. This distance is designed taking into consideration a width, a winding pitch, a wrap, and the like of the variable-thickness insulating tape 20, and examples include, as illustrated in FIG. 2, the tape part 22 having a length from 60 to 80 mm, being provided at an interval of 40 to 60 mm in the longitudinal direction.

Figure 4A:
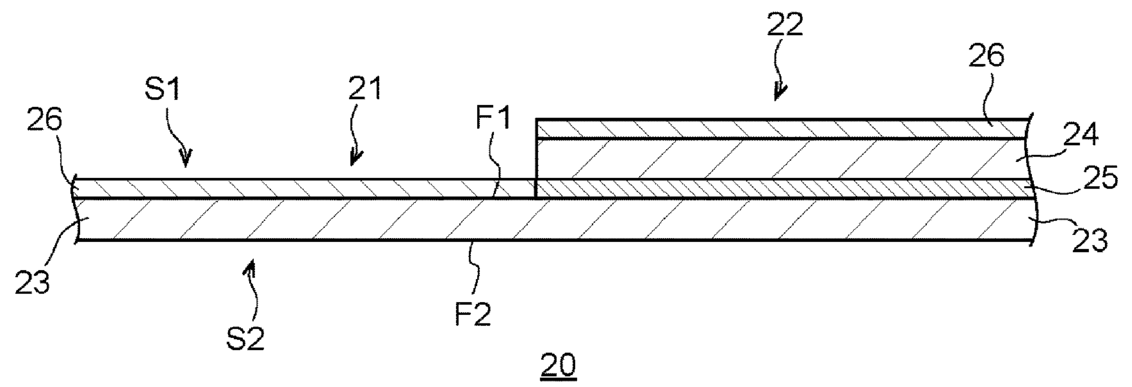
FIGS. 4A and 4B are examples of cross-sectional views of the variable-thickness insulating tape, FIG. 4A being the variable-thickness insulating tape provided with a bonding tape on a base material tape, and FIG. 4B being the variable-thickness insulating tape provided with a bonding tape on a base material tape and further provided with a cover tape on the bonding tape.

As illustrated in FIG. 4A, the variable-thickness insulating tape 20 is constituted by a base material tape 23 including two main surfaces F1, F2, and a bonding tape 24 bonded onto the one main surface F1 of the base material tape 23 via an adhesive layer 25, and has a simple structure that does not require complex processes.

The base material tape 23 constitutes the tape part 21 serving as the thin region B, and the base material tape 23 and the bonding tape 24 constitute the tape part 22 serving as the thick region A. The variable-thickness insulating tape 20 is wound on the outer periphery of the conductor 1, thereby forming the insulating coating 2 in which a portion wound by the tape part 21 is thin, and forming the insulating coating 3 in which a portion wound by the tape part 22 is thick. The adhesive layer is not provided on the other main surface F2 of the base material tape 23.

On the other hand, an adhesive layer 26 is provided on the bonding tape 24. Further, the adhesive layer 26 is also provided on the one main surface F1 of the base material tape 23, which is the bonding tape surface side of the tape part 21 to which the bonding tape 24 is not bonded. The adhesive layer 26 is provided on the one main surface F1 of the base material tape 23, which is the bonding tape surface side of the tape part 21, and on the bonding tape 24, and thus this variable-thickness insulating tape 20 is wound on the outer periphery of the conductor 1 with the adhesive layer 26 side on the conductor side (inside).

It should be noted that, although not illustrated, the variable-thickness insulating tape may have a form in which the adhesive layer 26 is provided on the other main surface F2, which is a flat surface side of the base material tape 23, and not provided on the bonding tape 24 on a surface side S1 of the bonding tape. In this case, the variable-thickness insulating tape is wound around the conductor with a flat surface side S2 of the base material tape 23, that is, the other main surface F2 of the base material tape 23, being on the conductor side.

Figure 4B:
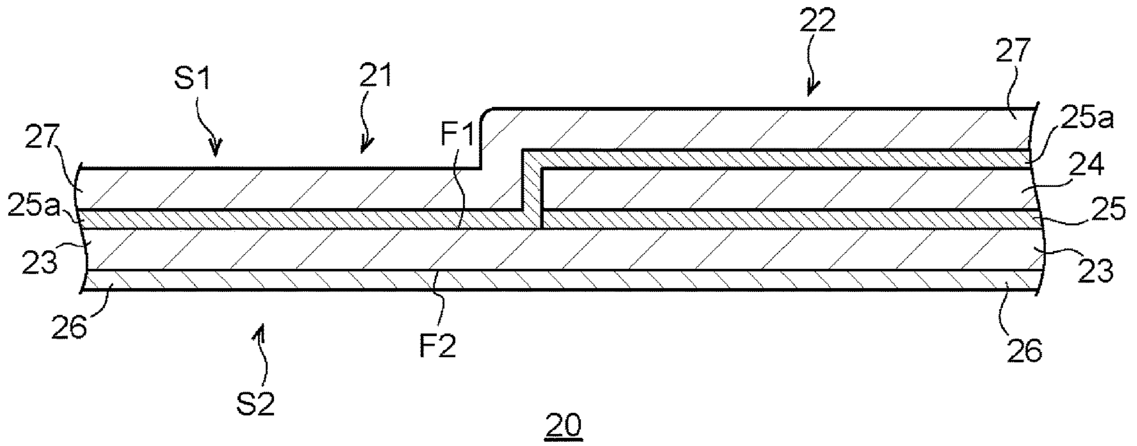

As illustrated in FIG. 4B, the variable-thickness insulating tape 20 has a so-called sandwich structure constituted by the base material tape 23, the bonding tape 24 bonded onto the one main surface F1 of the base material tape 23 via the adhesive layer 25, and a cover tape 27 covering the bonding tape 24 in its entirety via an adhesive layer 25*a*. With such a configuration, the variable-thickness insulating tape 20 can be fabricated with a simple structure that does not require complex processes and, furthermore, with use of the cover tape 27, a wrappability when wound around the conductor 1 can be improved.

The base material tape 23 and the cover tape 27 constitute the tape part 21 serving as the thin region B, and the base material tape 23, the bonding tape 24, and the cover tape 27 constitute the tape part 22 serving as the thick region A. The adhesive layer 26 is provided on the other main surface F2 of the base material tape 23 on the flat surface side S2. On the other hand, the adhesive layer is not provided on the cover tape 27. The adhesive layer 26 is provided on the other main surface F2 of the base material tape 23 on the flat surface side S2, and thus this variable-thickness insulating tape 20 is wound on the outer periphery of the conductor 1 with the adhesive layer 26 side on the conductor side (inside). It should be noted that, although not illustrated, the variable-thickness insulating tape may have a form in which the adhesive layer 26 is provided on the cover tape 27 and not provided on the flat surface side S2 of the base material tape 23, that is, the other main surface F2 of the base material tape 23. In this case, the variable-thickness insulating tape is wound around the conductor with the surface side S1 of the bonding tape being on the conductor side.

As illustrated in such FIGS. 4A and 4B, the adhesive layer 26 is provided on either the surface side S1 of the bonding tape or the flat surface side S2 of the base material tape. Then, the variable-thickness insulating tape 20 initially wound on the outer periphery of the conductor 1 is wound with the flat surface side S2 of the base material tape being on the inside (conductor side) or the outside and the adhesive layer 26 on the inside, and another variable-thickness insulating tape 20 further provided thereon is wound with the surface side S1 of the bonding tape being on the inside and the adhesive layer 26 being on the inside. In this way, the flat surface side S2 of the base material tape can be firmly adhered to the conductor. It should be noted that, in the case of further winding in layers, another variable-thickness insulating tape 20 further provided on the variable-thickness insulating tape 20 is wound with the surface side S1 of the bonding tape being on the inside (conductor side) and the adhesive layer 26 provided thereon on the inside, thereby making it possible to make the appearance of the insulating coating uniform and smooth. This has the effect of preventing the insulated wire 10 from snagging on a jig used during processing, such as in a case of manufacturing a coil with the insulated wire 10, thereby making it possible to suppress the occurrence of scratches during processing.

Further, the variable-thickness insulating tape 20 can be wound with the adhesive layer 26 being on an outside opposite to the conductor side. In this case, the tape is not firmly adhered to the conductor 1, making it easier to peel the insulating coatings 2, 3 of the variable-thickness insulating tape 20 during end part processing.

Materials of the base material tape 23 and the bonding tape 24 are preferably insulating materials having heat-resistant temperatures of the same level. With the heat-resistant temperatures of the base material tape 23 and the bonding tape 24 being the same level, heat resistances of the insulating coatings 2, 3 are also the same. In this way, the heat-resistant temperature of the variable-thickness insulating tape 20 is made uniform, and thus the heat-resistant temperatures of the insulating coatings 2, 3 are the same or substantially the same, which is preferable in terms of the heat resistance of the entire insulated wire. It should be noted that the heat-resistant temperatures being the same level refers to "Appended Table 11: Upper limits of operating temperatures of insulators used in electrical appliances and materials" stipulated in the Electrical Appliances and Material Safety Act specified by the Ministry of Economy, Trade, and Industry in Japan being the same.

Preferable examples of the adhesive layers 25, 26 include layers composed of thermoplastic resins such as acrylic, polyester, urethane, polyimide, polyvinyl chloride (PVC), or ethylene-vinyl acetate (EVA), or thermosetting resins such as an epoxy or bismaleimide. The thicknesses of the adhesive layers 25, 26 are, for example, desirably within a range from 0.2 μm to 50 μm, and preferably within a range from 0.5 μm to 40 μm, in particular.

The adhesive layers 25, 26 are adhesive layers that can be obtained by applying an adhesive coating obtained by dissolving these resins in an organic solvent to a predetermined thickness (2 μm, for example) by using a coating device for gravure printing or the like, for example. It should be noted that such an adhesive layer may be provided not only (as the adhesive layer 25) between the base material tape 23 and the bonding tape 24, but also (as the adhesive layer 25*a*) between the base material tape 23 and the cover tape 27 or as the adhesive layer 26 on one surface side (S1 or S2) of the variable-thickness insulating tape 20.

Figure 5:
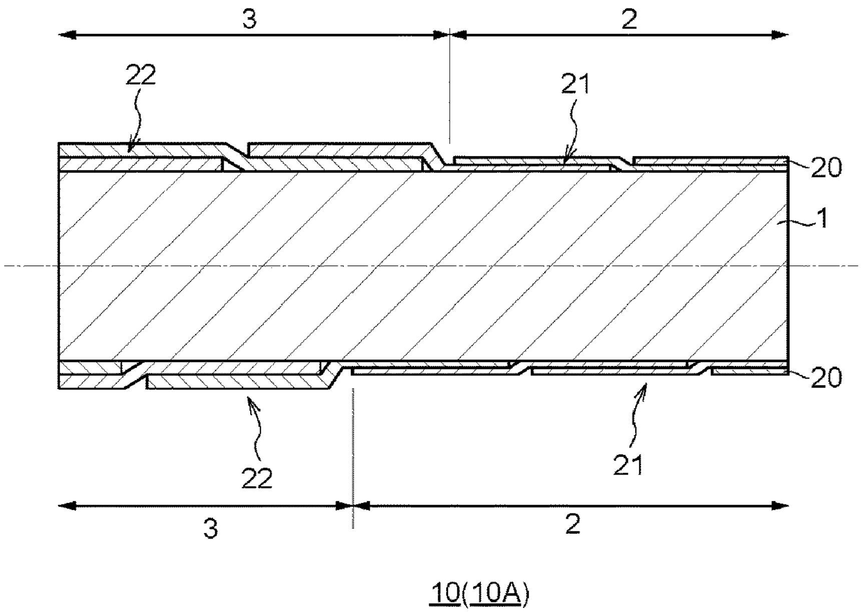
FIG. 5 is a longitudinal sectional view of an insulating coating structure of a first embodiment.
Figure 6:
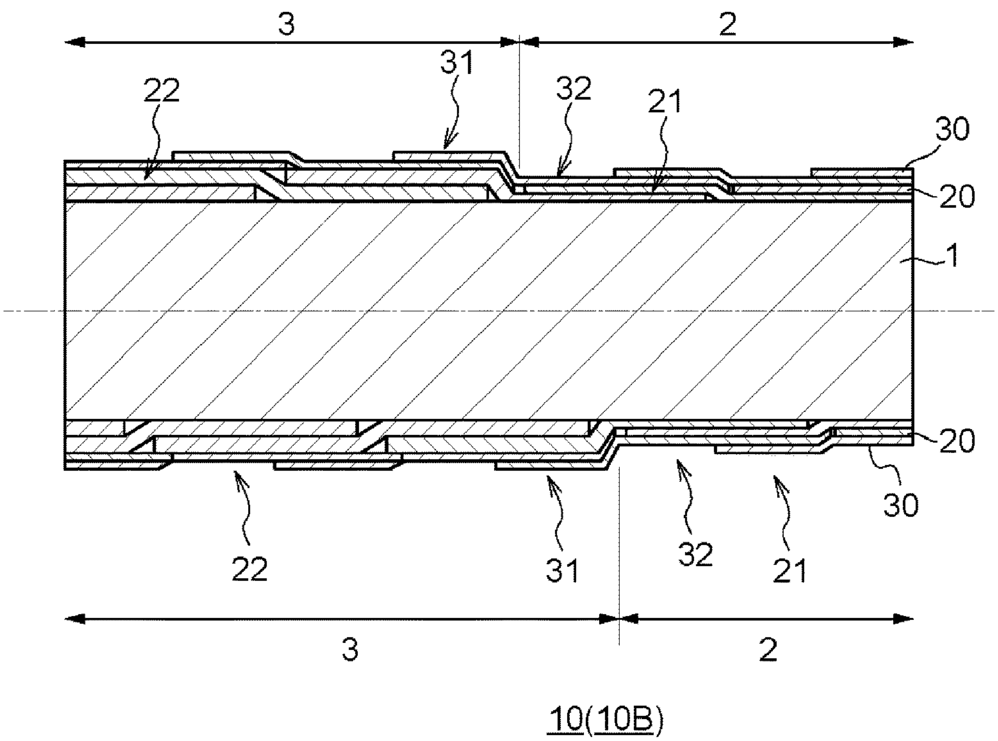
FIG. 6 is a longitudinal sectional view of an insulating coating structure of a second embodiment.
Figure 7:
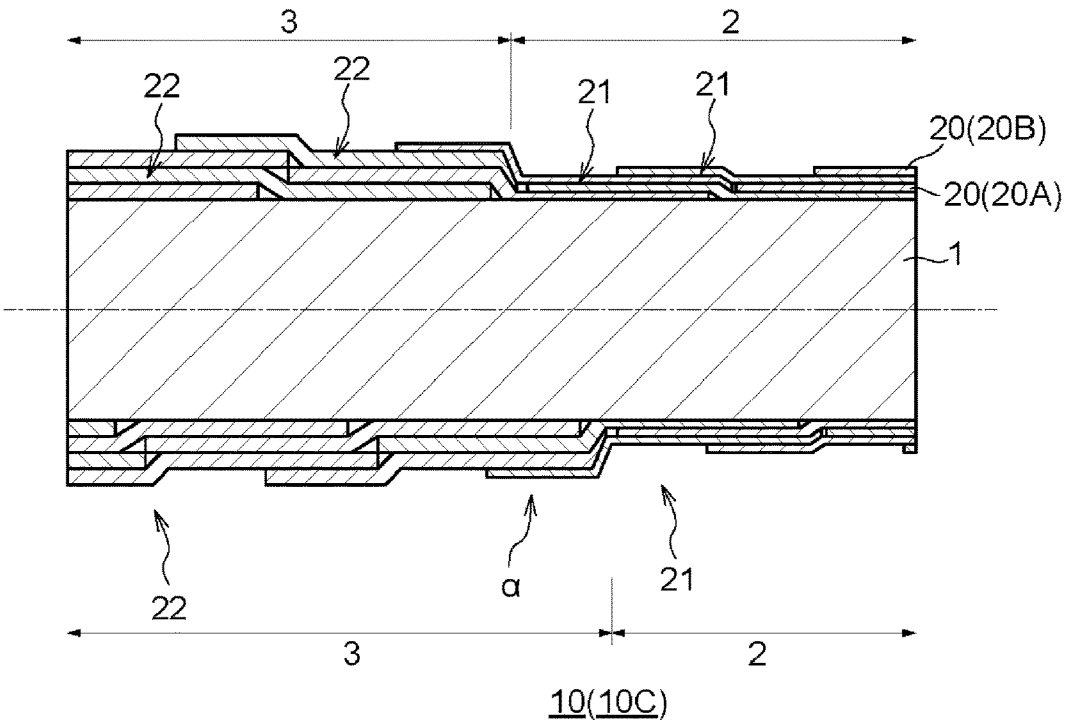
FIG. 7 is a longitudinal sectional view of an insulating coating structure of a third embodiment.
Figure 8:
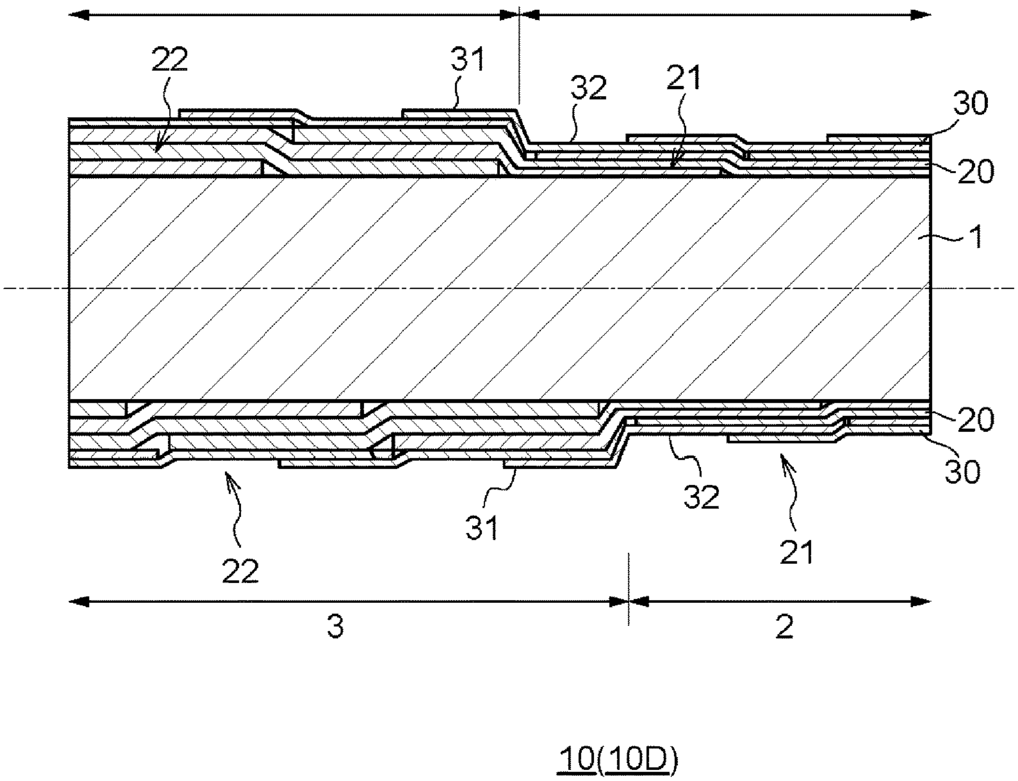
FIG. 8 is a longitudinal sectional view of an insulating coating structure of a fourth embodiment.

Thicknesses of the thin insulating coating 2 and the thick insulating coating 3 are designed as desired, depending on a degree of overlap (wrap) of the tape part 21 and the tape part 22 wound on the outer periphery of the conductor 1, the thickness of the tape further wound on outsides of the tape part 21 and the tape part 22, and the like. For example, in a case in which the tape part 21 is wound by ½ wrap, the tape part 21 has a two-layered structure as illustrated in FIG. 5 to FIG. 7, and thus the thickness of the tape part 21 is generally preferably ½ the thickness of the thin insulating coating 2 to be obtained. Further, in a case in which the tape part 21 is wound by ⅔ wrap, the tape part 21 has a three-layered structure as illustrated in FIG. 8, and thus the thickness of the tape part 21 is generally preferably ⅓ the thickness of the thin insulating coating 2 to be obtained. It should be noted that, in a case in which the adhesive layer 26 is provided on the other main surface F2, which is the one surface (flat surface) S2 of the base material tape 23, and constitutes the tape part 21, the thickness including the adhesive layer 26, is the thickness of the tape part 21, and thus the thickness of the base material tape 23 is designed taking into account the thickness of the adhesive layer 25. Further, as illustrated in FIG. 6 to FIG. 8, in a case in which a constant-thickness insulating tape 30 or the variable-thickness insulating tape 20 is further wound on the outside of the tape part 21 and the tape part 22, the thickness of the tape part 21 serving as the thin insulating coating 2 of the constant-thickness insulating tape 30 or the variable-thickness insulating tape 20 wound on the outside, and the thickness of the adhesive layer adhering the tape part 21 serving as the thin insulating coating 2 of the constant-thickness insulating tape 30 or the variable-thickness insulating tape 20 are added to the thickness of the tape part 21 to become the thickness of the thin insulating coating 2. In other words, in a case in which the constant-thickness insulating tape 30 or the variable-thickness insulating tape 20 is further wound on the outsides of the tape part 21 and the tape part 22, in the tape part 21 serving as the thin insulating coating 2, the thickness of the constant-thickness insulating tape 30 or the variable-thickness insulating tape 20 wound on the outside is added to the thickness of the adhesive layer adhering the constant-thickness insulating tape 30 or the variable-thickness insulating tape 20 to become the thickness of the thin insulating coating 2.

The tape part 22 is also wound on the outer periphery of the conductor 1, and thus the thickness of tape part 22 is the sum of the thickness of the base material tape 23, the thickness of the bonding tape 24, and the thickness of the adhesive layer 25 provided therebetween, and is designed in correspondence with the degree of overlap of tape part 22. For example, in a case in which the tape part 22 is wound by ½ wrap, the tape part 22 has a two-layered structure as illustrated in FIG. 5 to FIG. 7, and thus the thickness of the tape part 22 is generally preferably ½ the thickness of the thick insulating coating 3 to be obtained. Further, in a case in which the tape part 22 is wound by ⅔ wrap, the tape part 22 has a three-layered structure as illustrated in FIG. 8, and thus the thickness of the tape part 22 is generally preferably ⅓ the thickness of the thin insulating coating 3 to be obtained. Furthermore, as illustrated in FIG. 6 to FIG. 8, in a case in which the constant-thickness insulating tape 30 or the variable-thickness insulating tape 20 is further wound on the outsides of the tape part 21 and the tape part 22, the thickness of the tape part 22 serving as the thick insulating coating 3 of the constant-thickness insulating tape 30 or the variable-thickness insulating tape 20 wound on the outside, and the thickness of the adhesive layer adhering the tape part 22 serving as the thick insulating coating 3 of the constant-thickness insulating tape 30 or the variable-thickness insulating tape 20 are added to the thickness of the tape part 22 to become the thickness of the thick insulating coating 3. In other words, in a case in which the constant-thickness insulating tape 30 or the variable-thickness insulating tape 20 is further wound on the outsides of the tape part 21 and the tape part 22, in the tape part 22 serving as the thick insulating coating 3, the thickness of the constant-thickness insulating tape 30 or the variable-thickness insulating tape 20 wound on the outside is added to the thickness of the adhesive layer adhering the constant-thickness insulating tape 30 or the variable-thickness insulating tape 20 to become the thickness of the thick insulating coating 3.

It should be noted that, in a case in which the adhesive layer 26 is provided on either the surface side S1 of the bonding tape 24 or the one surface side (flat surface side S2) of the base material tape 23 to constitute the tape part 22, the thickness including the adhesive layer 26 is the thickness of the tape part 22, and thus the thickness of the tape part 22, that is, the thickness of the base material tape 23, the thickness of the bonding tape 24, and the thickness of the adhesive layer 25 provided therebetween are designed taking into account the thickness of the adhesive layer 26.

The adhesive layer 26 is preferably provided on one surface (S1 or S2) of the variable-thickness insulating tape 20. In a case in which the adhesive layer 26 is provided on the other main surface F2 serving as the flat surface side S2 of the base material tape, the surface side S2 can be adhered to the outer periphery of the conductor 1. In a case in which the adhesive layer 26 is provided on the bonding tape surface side S1, the surface side S1 can be adhered to the outer periphery of the conductor 1. Although whether the surface S1 or S2 is to be wound on the conductor side can be selected as desired, preferably the variable-thickness insulating tape 20 initially wound is provided with the adhesive layer 26 on the other main surface F2 serving as the flat surface side S2 of the base material tape to wind the flat surface side S2 of that base material tape on the conductor side, and the variable-thickness insulating tape 20 wound in a layer thereon is provided with the adhesive layer 26 on the bonding tape surface side S1 to wind the bonding tape surface side S1 on the conductor side, as illustrated in FIG. 7, for example. In this way, the flat surface side S2 of the base material tape can be adhered to the conductor 1, each variable-thickness insulating tape 20 can be adhered, even when wound in layers, and the appearance of the insulating coating can be made uniform and smooth.

It should be noted that the variable-thickness insulating tape 20 can be wound with the adhesive layer 26 being on an outside opposite to the conductor side. In this case, the variable-thickness insulating tape 20 is not firmly adhered to the conductor 1, making it easier to peel the insulating coatings 2, 3 of the variable-thickness insulating tape 20 during end part processing.

The variable-thickness insulating tape 20 is preferably set at a predetermined width corresponding to the diameter of the conductor 1 so as to facilitate being wound around the conductor 1. The width is not particularly limited, but may be about 2 to 15 times the diameter of conductor 1. Large-area sheets fabricated for the variable-thickness insulating tape can be slit and formed to a predetermined width. This makes it possible to obtain the variable-thickness insulating tape 20 for an easy-to-wrap wire especially suitable for the insulated wire 10 for a coil.

The variable-thickness insulating tape 20 can be fabricated by various methods exemplified in FIG. 14 to FIG. 17 described below, and is not particularly limited. For example, (1) the variable-thickness insulating tape may be fabricated by bonding a tape of the same size as the base material tape 23 on the base material tape 23, subsequently removing the tape of a portion corresponding to the thin insulating coating 2, and then using the remaining portion as the bonding tape 24. Removal can be performed by making a cut in the tape and then peeling the tape from the cut portion. Further, (2) the variable-thickness insulating tape may be fabricated by bonding the bonding tape 24 formed to a predetermined length on the base material tape 23. Furthermore, (3) the variable-thickness insulating tape may be fabricated by bonding a tape of the same size as a release tape on the release tape, subsequently removing the tape of a portion corresponding to the thin insulating coating 2, using the remaining portion as the bonding tape 24, bonding the base material tape 23 on the bonding tape 24, and lastly removing the release tape.

Here, a configuration for making the visibilities of each of the insulating coatings 2, 3 different by changing the respective colors will be described.

The thin insulating coating 2 is mainly constituted by the tape part 21 serving as the thin region B in FIG. 2, and the thick insulating coating 3 is mainly constituted by the tape part 22 serving as the thick region A in FIG. 2. Therefore, the insulating coatings need only be formed so that the visibility of the tape part 22 mainly constituting the thick insulating coating 3, and the visibility of the tape part 21 mainly constituting the thin insulating coating 2 differ. Here, a form is exemplified in which the color of the thick insulating coating 3 is darker than the color of the thin insulating coating 2, or the thick insulating coating 3 is colored and the thin insulating coating 2 is not colored.

With the tape part 22 serving as the thick region A being colored, the thick insulating coating 3 mainly constituted by the tape part 22 can be colored. Specifically, to color the tape part 22 with a simple structure that does not require a complex process, either or both the adhesive layer 25 or/and the bonding tape 24 need only be colored. To color the adhesive layer 25 and the bonding tape 24, a colorant such as red, blue, green, yellow, or orange may be used, but red is preferred in a case in which discrimination is to be improved. The colorant may be any pigment or dye. It should be noted that, at this time, the tape part 21 serving as the thin region B is not colored, and thus the thin insulating coating 2 mainly constituted by the tape part 21 is in a non-colored state.

As mentioned above, by making the colors of the tape part 21 and the tape part 22 different, it is possible to make the visibilities of the insulating coatings 2, 3 provided on the outer periphery of the conductor 1 different, as illustrated in FIGS. 5 to 7. Specifically, the tape part 22 mainly constitutes the thick insulating coating 3 and thus, with the tape part 22 being colored, the thick insulating coating 3 is in a colored state. Further, because the tape part 21 mainly constitutes the thin insulating coating 2, the tape part 21 is not colored, thereby making it possible to constitute the insulating coating 2 having a color different from that of insulating coating 3. Thus, the thick insulating coating 3 can be distinguished from the thin insulating coating 2, thereby making it possible for a worker, a discrimination sensor, or the like to discriminate between the thin insulating coating 2 and the thick insulating coating 3 during coil fabrication, and thus make the coil manufacturing process easier.

(Constant-Thickness Insulating Tape)

The constant-thickness insulating tape 30 is a tape having a constant thickness that, as illustrated in FIG. 6 and FIG. 8, is wound on the variable-thickness insulating tape 20 and preferably in an opposite direction, and a resin tape with a so-called adhesive layer is used. This constant-thickness insulating tape 30 is wound on an outer periphery of the variable-thickness insulating tape 20, thereby making it possible to make the appearance of the insulating coating uniform and smooth, and cover and protect the variable-thickness insulating tape 20. The constant-thickness insulating tape 30 is wound with the side of the adhesive layer being on the side of the variable-thickness insulating tape 20.

A material of the constant-thickness insulating tape 30 is preferably the same as that of the base material tape 23 constituting the variable-thickness insulating tape 20 described above. A thickness of the constant-thickness insulating tape 30 is not particularly limited as long as, after being wound, the tape part 21 and tape part 22 are thick enough to ensure the required withstand voltage. For example, the thickness may be about 0.002 to 0.1 mm.

The adhesive layer constituting the constant-thickness insulating tape 30 is provided on one surface of the constant-thickness insulating tape 30. A material of the adhesive layer may be the same as that of the adhesive layers 25, 26 constituting the variable-thickness insulating tape 20 described above. The constant-thickness insulating tape 30 is provided by being transversely wound with the adhesive layer side being on the inside (side of the variable-thickness insulating tape), and immediately or subsequently adhered by being heated or the like. In this way, the constant-thickness insulating tape 30 can be adhered to the variable-thickness insulating tape 20 positioned therebelow. The thickness of the adhesive layer is also not particularly limited, but may be, for example, about 0.001 to 0.05 mm. It should be noted that, in a case in which the tape part 21 and the tape part 22 differ in color, the constant-thickness insulating tape 30 used is preferably transparent or translucent without coloration.

(Winding Angle and Winding Form)

Next, a winding angle and a winding form will be described with reference to FIG. 9 to FIG. 11. FIGS. 9A and 9B are configuration views illustrating form examples of the variable-thickness insulating tape 20. FIG. 9A is form example in which a boundary line 19 between the tape part 22 serving as the thick region A and the tape part 21 serving as the thin region B is orthogonal to the longitudinal direction X of the variable-thickness insulating tape 20, and FIG. 9B is a form example in which the boundary line 19 between the tape part 22 and the tape part 21 is at a predetermined angle $\theta 2$ with respect to the longitudinal direction X of the variable-thickness insulating tape 20. This way, the angle θ2 may be a right angle to the longitudinal direction X or a smaller angle (that is, the angle in a case in which the boundary line 19 between the tape part 22 serving as the thick region A and the tape part 21 serving as the thin region B is formed obliquely with respect to the longitudinal direction X of the variable-thickness insulating tape 20).

In a case in which the angle θ2 is a right angle, as illustrated in FIG. 1A, a portion in which the thin insulating coating 2 changes to the thick insulating coating 3 is the tapered part 3*a* having a short length, resulting in the occurrence of a slight step with a change in diameter. On the other hand, in a case in which the angle θ2 is less than 90°, as illustrated in FIG. 1B, a portion in which the thin insulating coating 2 changes to the thick insulating coating 3 is the tapered part 3*a* having a long length, and thus a change in diameter becomes smaller as the angle θ2 becomes smaller, the taper becomes gradual, and the step is eliminated. It should be noted that, when the angle θ2 is too acute, it is difficult to fabricate the variable-thickness insulating tape 20 itself, and thus the angle θ2 is desirably within a range of about 10° to 90°, and more preferably within a range from 15° to 60°.

Figure 10A:
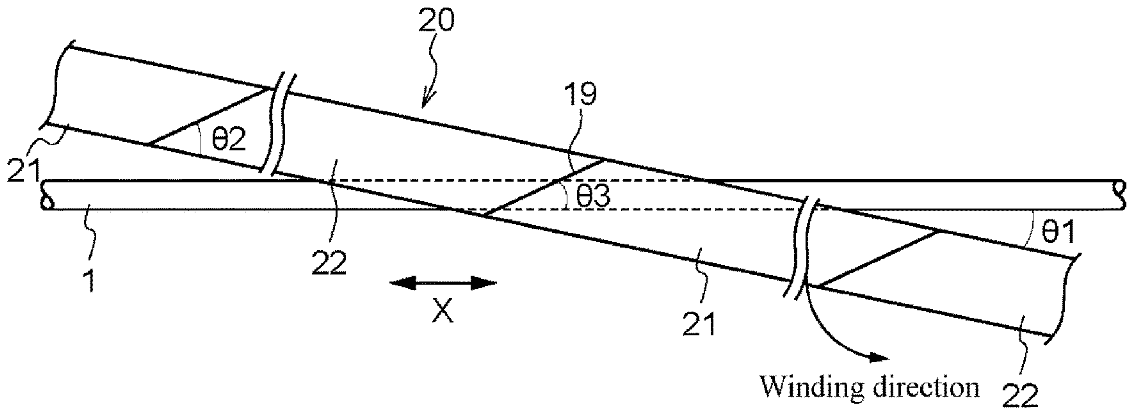
FIGS. 10A and 10B are form examples in which the tape illustrated in FIG. 9B is wound at a predetermined winding angle θ1 with respect to a conductor, FIG. 10A being an example of winding in a winding direction in which an angle θ3 between the boundary line of the tape and the longitudinal direction of the conductor becomes smaller than the boundary line angle θ2 of the tape, and FIG. 10B being an example of winding in a winding direction in which the angle θ3 between the boundary line of the tape and the longitudinal direction of the conductor becomes larger than the boundary line angle θ2 of the tape.
Figure 10B:
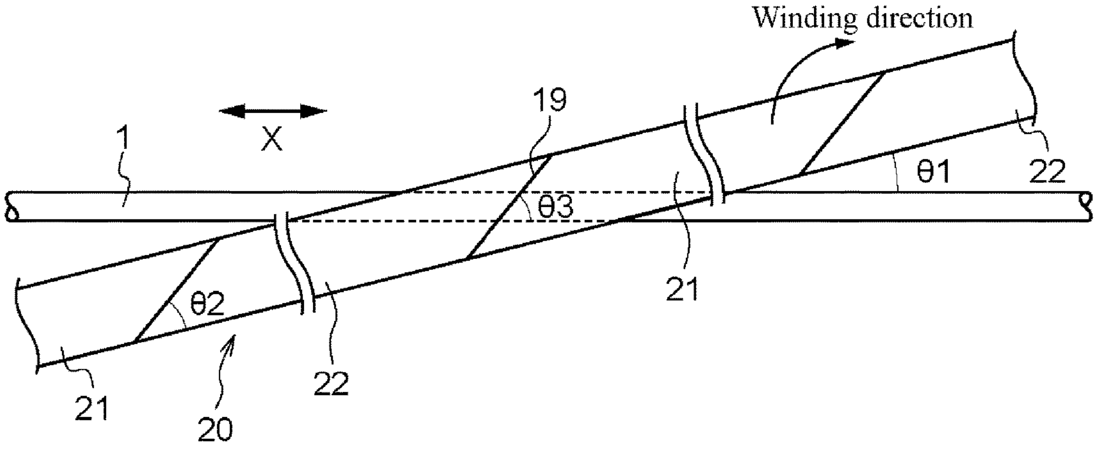

FIGS. 10A and 10B are examples of winding the variable-thickness insulating tape 20 illustrated in FIG. 9B at a predetermined winding angle θ1 with respect to the conductor 1. FIG. 10A is an example of winding in a winding direction in which the angle θ3 between the boundary line 19 of the variable-thickness insulating tape 20 and the longitudinal direction X of the conductor 1 is smaller than the angle θ2 of the boundary line 19 of the variable-thickness insulating tape 20. On the other hand, FIG. 10B is an example of winding in a winding direction in which the angle θ3 between the boundary line 19 of the variable-thickness insulating tape 20 and the longitudinal direction X of the conductor 1 is greater than the angle θ2 of the boundary line 19 of the variable-thickness insulating tape 20. It should be noted that θ1 is the angle between the longitudinal direction X of the conductor 1 and the longitudinal direction of the variable-thickness insulating tape 20.

In the examples illustrated in FIGS. 10A and 10B, a case of winding in a direction in which θ2>θ3 as illustrated in FIG. 10A makes it possible to reduce abrupt changes in an outer diameter of the insulated wire 10, around which the boundary line 19 portion of the variable-thickness insulating tape 20 is wound, compared to a case of winding in a direction in which θ2<θ3 as illustrated in FIG. 10B. As a result, the amount of change in the outer diameter is reduced, thereby making it possible to make the change in coating thickness smooth. In particular, in a case in which the variable-thickness insulating tape 20 having a large change in thickness is used, this is advantageous in that the abrupt change in outer diameter of the insulated wire 10 can be reduced. It should be noted that, in the examples in FIGS. 10A and 10B, in a case in which θ1 is 20° and θ2 is 45°, for example, θ3 is approximately 25° in FIG. 10A and approximately 65° in FIG. 10B. In the case in which θ3 is 25°, the thickness change in the longitudinal direction X occurs along the boundary line 19, thereby making it possible to gradually change the outer diameter, compared to in the case in which θ3 is 65°. As a result, the abrupt change in the outer diameter is reduced, thereby making it possible to make the change in outer diameter smooth. It should be noted that, the winding angle θ1 is desirably within a range from 10° to 60°, and more preferably within a range from 15° to 40°.

Figure 11:
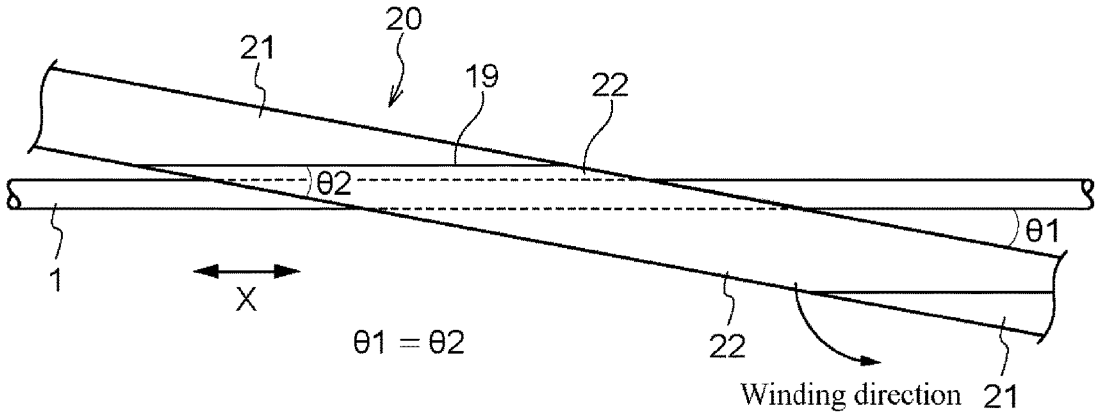
FIG. 11 is an example of winding the tape illustrated in FIG. 9B at the predetermined winding angle θ1 with respect to the conductor, and is an example in which the boundary line angle θ2 of the tape is the same as the winding angle θ1 of the tape and the angle θ3 between the boundary line and the longitudinal direction of the conductor is 0°.

It should be noted that, as illustrated in FIG. 11, the angle θ3 is most preferably 0°. That is, in a case in which the variable-thickness insulating tape 20 illustrated in FIG. 9B is wound at the predetermined winding angle θ1 with respect to the conductor 1, by making the angle θ2 of the boundary line 19 of the variable-thickness insulating tape 20 and the winding angle θ1 of the variable-thickness insulating tape 20 the same, it is possible to set the angle θ3 between the boundary line 19 and the longitudinal direction X of the conductor 1 to 0°. The thickness of the insulating coating of the insulated wire 10 after the variable-thickness insulating tape 20 is wound varies along the boundary line 19. In this way, the change in outer diameter of the insulated wire 10 in the longitudinal direction X can be minimized, and thus the step caused by the outer diameter change can be reduced and the change in outer diameter can be made smoother. Specifically, the form illustrated in FIG. 1B is preferable to the form illustrated in FIG. 1A. It should be noted that, as illustrated in FIGS. 10A and 10B and FIG. 11, when the tape illustrated in FIGS. 9A and 9B is wrapped around the conductor, the taper ratio can be set as appropriate by adjusting the tape width and/or the angles θ1 to θ3 of the variable-thickness insulating tape 20 used.

First Embodiment

Figure 12A:
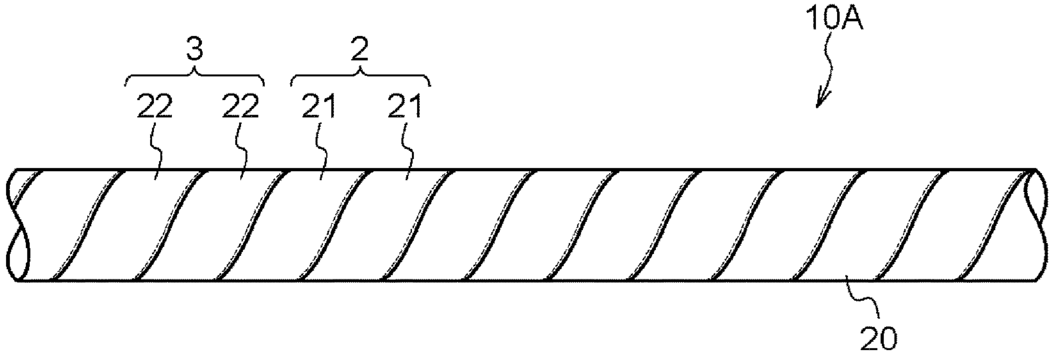
FIGS. 12A and 12B are external views illustrating form examples of wrap winding, FIG. 12A being an example of half-wrap winding the variable-thickness insulating tape, and FIG. 12B being an example of one-third wrap winding the variable-thickness insulating tape to be wound in layers.

An insulated wire 10A of a first embodiment illustrated in FIG. 5 has a form in which the variable-thickness insulating tape 20 is wound on the outer periphery of the conductor 1 by ½ wrap, and the thin insulating coating 2 and the thick insulating coating 3 are repeated. It should be noted that FIG. 12A is an external view of the insulated wire 10A having a form in which the variable-thickness insulating tape 20 is wound by ½ wrap. In the drawing, solid lines indicate edges of the variable-thickness insulating tape 20, and dotted lines indicate steps in the same tape of the variable-thickness insulating tape 20.

The tape part 21 and tape part 22 of the variable-thickness insulating tape 20 are wound around the conductor 1, thereby constituting the thin insulating coating 2 and the thick insulating coating 3. At this time, a slight step occurs in a portion where an edge portion of the variable-thickness insulating tape 20 switches as illustrated in FIG. 5.

In such a configuration, by coloring the tape part 22 constituting the thick insulating coating 3, it is possible to color the portion of the insulating coating 3 and not color the portion of insulating coating 2 in FIG. 12A, make the visibilities of the insulating coatings 2, 3 different, and easily identify the portion of the thick insulating coating 3 and the portion of the thin insulating coating 2.

Second Embodiment

Figure 12B:
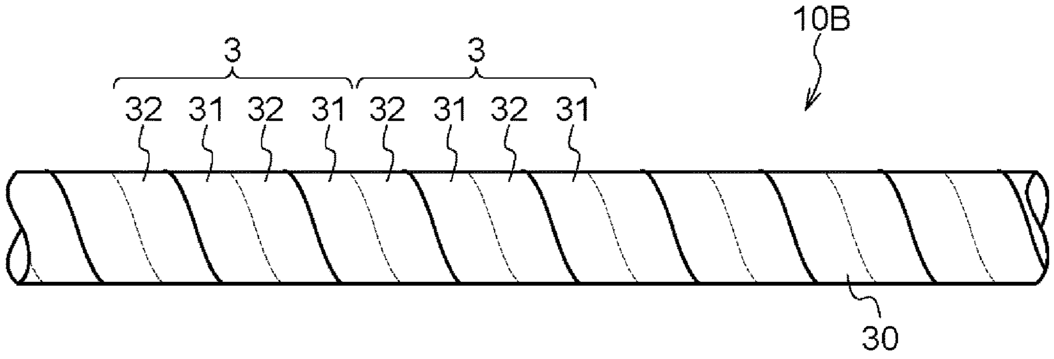

An insulated wire 10B of a second embodiment illustrated in FIG. 6 has a form in which the variable-thickness insulating tape 20 is wound on the outer periphery of the conductor 1 by ½ wrap, the constant-thickness insulating tape 30 is further wound on the outer periphery of the variable-thickness insulating tape 20 by ⅓ wrap, and the thin insulating coating 2 and the thick insulating coating 3 are repeated. A winding direction of the variable-thickness insulating tape 20 and a winding direction of the constant-thickness insulating tape 30 may be the same or opposite, but opposite directions are preferred. In a case in which the winding directions are opposite directions, the insulating coating thickness can be made uniform and smooth. It should be noted that reference sign 31 denotes a over-wrapped part and reference sign 32 denotes a non-over-wrapped part. This has the effect of preventing the insulated wire from snagging on a jig used during processing, such as in a case of manufacturing a coil with an insulated wire, thereby making it possible to suppress the occurrence of scratches during processing. It should be noted that FIG. 12B is an external view of the insulated wire 10B having a form in which the constant-thickness insulating tape 30 is wound by ⅓ wrap on an outermost layer. In the drawing, solid lines indicate edges of the constant-thickness insulating tape 30, and dotted lines indicate steps in the same tape of the constant-thickness insulating tape 30.

The constant-thickness insulating tape 30 is wound on the outer periphery of the variable-thickness insulating tape 20, thereby constituting the thin insulating coating 2 and the thick insulating coating 3. At this time, as illustrated in FIG. 6, the constant-thickness insulating tape 30 is affected by the step between the tape part 21 and the tape part 22 of the variable-thickness insulating tape 20 of the lower layer, as well as the step occurs between the overwrapped part 31 and non-overwrapped part 32. In such a configuration, with the tape part 22 constituting the thick insulating coating 3 being colored and a colorless transparent or translucent tape being adopted for the constant-thickness insulating tape 30, it is possible to color the portion of the insulating coating 3 and no color the portion of the insulating coating 2 in FIG. 12B. Thus, it is possible to make the visibilities of the insulating coatings 2, 3 different, and easily identify the portion of the thick insulating coating 3 and the portion of the thin insulating coating 2.

Third Embodiment

An insulated wire 10C of a third embodiment illustrated in FIG. 7 has a form in which a variable-thickness insulating tape 20A is wound on the outer periphery of the conductor 1 by ½ wrap, another variable-thickness insulating tape 20B is further wound on an outer periphery of the variable-thickness insulating tape 20A by ⅓ wrap, and the thin insulating coating 2 and the thick insulating coating 3 are repeated. In this case, as illustrated in FIG. 7, the other variable-thickness insulating tape 20B is wound in a layer so that the thick region A thereof overlaps the thick insulating coating 3 already formed. In this way, the thick insulating coating 3 can be further thickened. As in this third embodiment, a plurality of the variable-thickness insulating tapes 20 (20A, 20B) are wound, thereby making it possible to further thicken the thick insulating coating 3 and obtain the insulated wire 10 having an increased withstand voltage.

It should be noted that the thick insulating coating 3 is mainly constituted by the tape part 22 of the variable-thickness insulating tape 20, but may be partially constituted by the tape part 21 of the variable-thickness insulating tape 20 (20B) as in an a portion illustrated in FIG. 7. That is, the thick insulating coating 3 need not be constituted by only the tape part 22 of the variable-thickness insulating tape 20, and may partially include the tape part 21. Further, similarly, the thin insulating coating 2 need not be constituted by only the tape part 21 of the variable-thickness insulating tape 20, and may partially include the tape part 22.

Fourth Embodiment

An insulated wire 10D of a fourth embodiment illustrated in FIG. 8 has a form in which the variable-thickness insulating tape 20 is wound on the outer periphery of the conductor 1 by ⅔ wrap, the constant-thickness insulating tape 30 is further wound on the outer periphery of the variable-thickness insulating tape 20 by ⅓ wrap, and the thin insulating coating 2 and the thick insulating coating 3 are repeated. The variable-thickness insulating tape 20 is wound by ⅔ wrap, thereby forming the thick insulating coating 3 wound in layers by three-layered winding. In this way, a thicker insulating coating 3 can be formed. Although the number of layered windings can be increased to four or more, with ⅔ wrap as the maximum, it is possible to make loosening and deviation of the winding, which occur with the thick insulating coating 3 in particular, less likely, and achieve stable manufacture, and thus three-layered winding or less is preferred. It should be noted that ⅔ wrap refers to winding the variable-thickness insulating tape 20 and/or the constant-thickness insulating tape 30 while overlapping the tape(s) by ⅔, ultimately resulting in three layers.

Other Configurations

The outermost periphery of the insulated wire 10 may be provided with an insulating outer coating (not illustrated) made of extruded resin, as necessary. This insulating outer coating is provided on the outer periphery of the insulated wire 10 illustrated in FIG. 1, and a material thereof is not particularly limited as long as the material has insulation. As a constituent resin of the insulating outer coating, various resins applicable to resin extrusion can be used. For example, the resin may be a fluorine-based resin such as PFA, ETFE, or FEP, may be a vinyl chloride resin, may be a polyolefin resin such as polyethylene, or may be a polyester resin such as polyethylene terephthalate. A thickness of the insulating outer coating may be within a range of about 0.05 to 1.0 mm, for example. It should be noted that, in a case in which a discrimination of the insulating coatings 2, 3 differ, preferably a colorless transparent or translucent material is used as the extruded resin.

[Coil]

Figure 13:
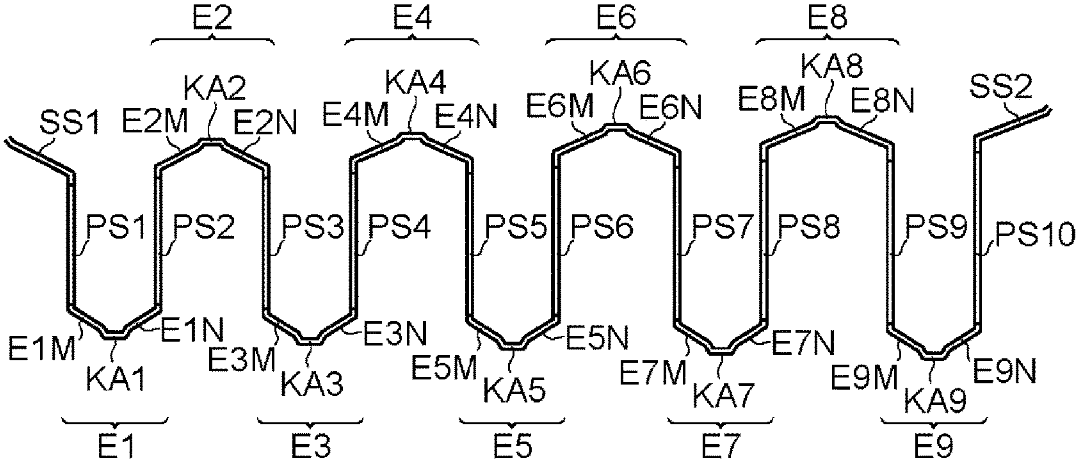
FIG. 13 is a configuration extended view of a coil for a three-phase induction motor.

FIG. 13 is a configuration extended view of the coil 40 according to the present invention. The coil 40 is a coil obtained by winding the above-described insulated wire 10 according to the present invention, and is configured so that the insulating coating 3 of the insulated wire 10 in an area where voltage increases and partial discharge readily occurs is thick, and the insulating coating 2 of the insulated wire 10 in an area where voltage does not increase and partial discharge does not readily occur is thin.

In such a coil 40, the insulating coating 3 of the insulated wire in the area where partial discharge readily occurs is thick, thereby making it possible to, for example, increase the partial discharge starting voltage at a crossing part, and the insulating coating 2 of the insulated wire in the area where partial discharge does not readily occur is thin, thereby making it possible to improve and not worsen the occupancy ratio. These areas are repeatedly provided at a desired interval, and thus, for example, in a case in which the coil is preferably applied as a coil for a three-phase induction motor, the thin insulating coating 2 can be set in the slot conductor part of the motor, and the thick insulating coating 3 can be set in an area where high voltage of the crossing part connecting the slot conductor part of the motor is applied.

FIG. 13 is a configuration extended view of the coil 40 in the case of use for a three-phase induction motor. In the configuration extended view, the coil 40 is constituted by circumferential conductive wire parts E1 to E9, linear conductive wire parts PS1 to PS10, circumferential conductive wire front parts E1M to E9M, non-step-formation parts KA1 to KA9, circumferential conductive wire rear parts E1N to E9N, and bent end parts SS1, SS2. In this case, the thin insulating coating 2 of the insulated wire 10 is disposed on the linear conductive wire parts PS1 to PS10. On the other hand, the thick insulating coating 3 of the insulated wire 10 is disposed on the circumferential conductive wire parts E1 to E9.

In this way, the occupancy ratio of the coil winding can be increased by setting the thin insulating coating 2, which can withstand application of phase voltages, for the insulated wire disposed in the stator slot conductor part. Further, in the case of a three-phase induction motor, because each phase voltage is applied to the stator slot conductor part, the crossing part connecting the stator slot conductor part is brought close to or in contact with the crossing part of another phase, and an interphase voltage, specifically a line voltage (√3 times the phase voltage) of the other phase is applied to the crossing part. As a result, although partial discharge is likely to occur at the crossing part, by setting the thick insulating coating 3 for the crossing part connecting the stator slot conductor part to which line voltage is applied, it is possible to increase the partial discharge starting voltage at the crossing part.

At this time, the thin insulating coating 2 of the insulated wire 10 and the thick insulating coating 3 of insulated wire 10 are configured with different visibilities so as to support each arrangement, thereby making it possible to clearly distinguish the insulating coatings 2, 3 from each other, improving arrangement workability.

[Method of Manufacturing Variable-Thickness Insulating Tape]

A method of manufacturing the variable-thickness insulating tape 20 according to the present invention is a method of manufacturing a tape repeatedly provided with the thin portion 21 and the thick portion 22 and, while not particularly limited, examples thereof include the methods illustrated in FIG. 14 to FIG. 16.

Figure 14A:
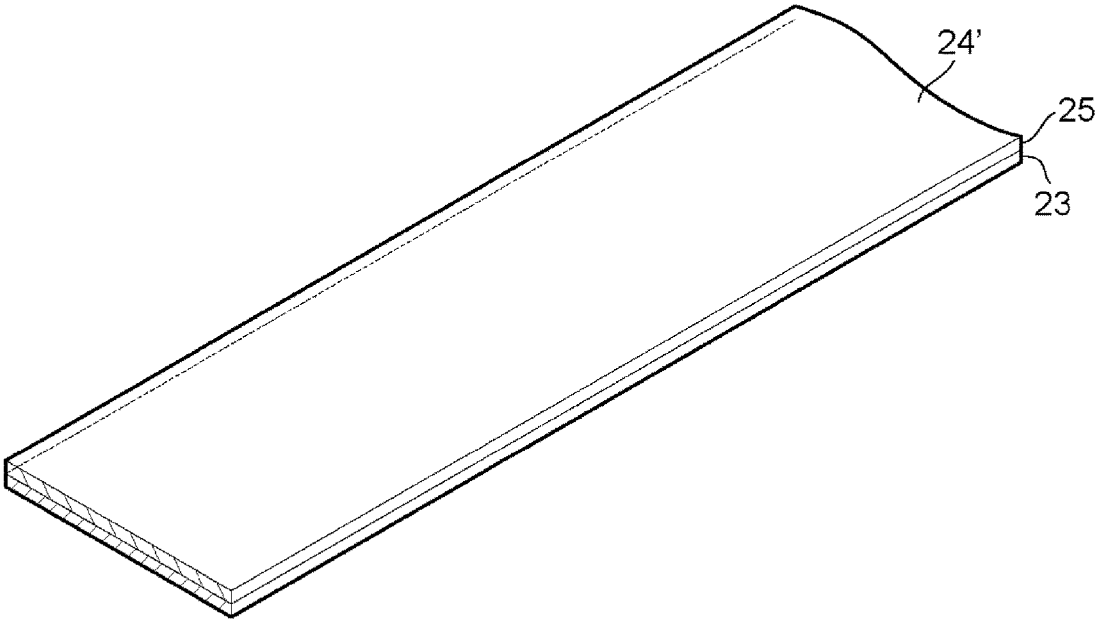
FIGS. 14A to 14C are process views illustrating an example of a method of manufacturing the variable-thickness insulating tape according to the present invention.
Figure 14B:
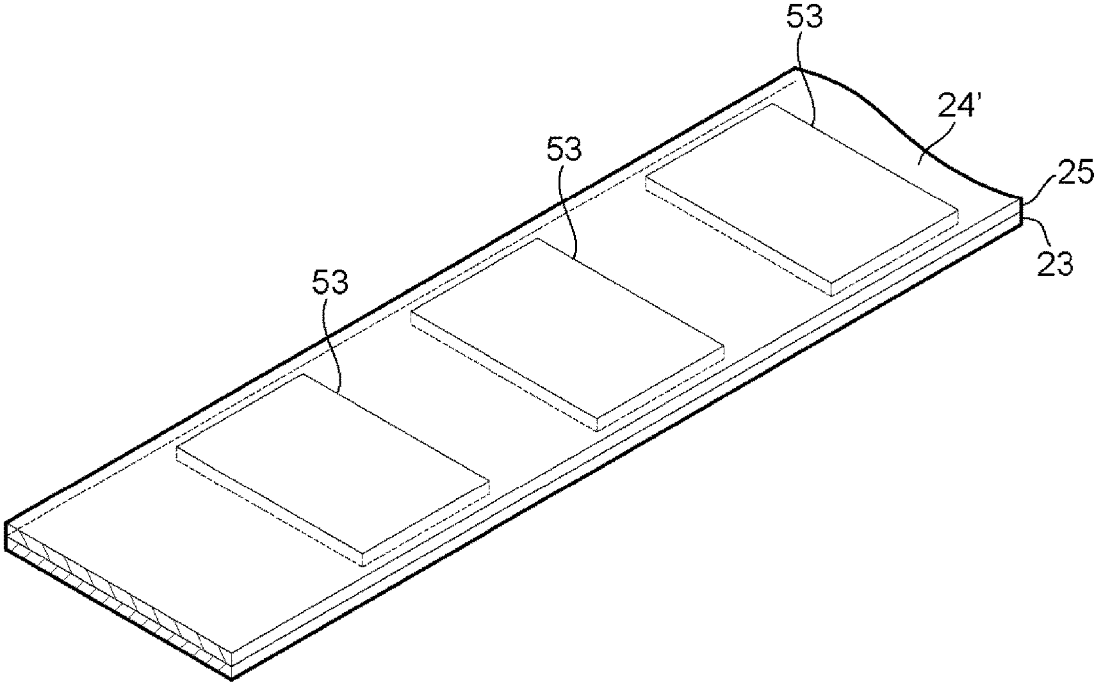
Figure 14C:
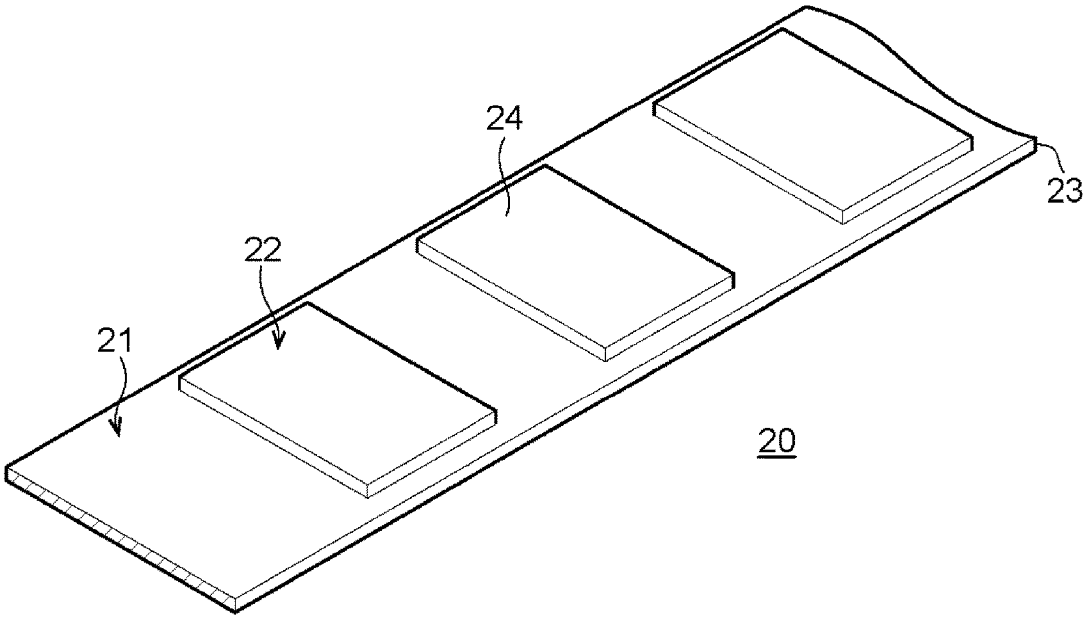

(a) The method illustrated in FIGS. 14A to 14C is a method of temporarily adhering a bonding base tape 24' on the thin base material tape 23, removing the bonding base tape 24' in a predetermined shape, and then using a remaining portion of the bonding base tape 24' as the bonding tape 24 (thick portion 22).

First, as illustrated in FIG. 14A, the bonding base tape 24' of the same size as the thin base material tape 23 is temporarily adhered on the base material tape 23. Temporary adherence can be performed by various means and the method is not particularly limited, but examples thereof include a method of temporary adherence by bonding with an adhesive, a method of temporary adherence by heat using a laminate, or the like. A type and a thickness of the adhesive is as described above. The adhesive may be provided on the base material tape 23, may be provided on the bonding base tape 24', or may be provided on both tapes 23, 24. From the standpoint of visibility, preferably a colored adhesive is provided on the bonding tape 24.

In a case in which the adhesive is a tacky adhesive, temporary adherence is performed by applying pressure and, in a case in which the adhesive is a thermal adhesive, performed by heating along with applying pressure. Further, when both tapes are bonded, an adhesive may be supplied so as to flow between the tapes. Lamination is performed by heat lamination and, for example, temporary adherence can be performed by applying pressure with a heat roll while applying heat.

After temporary adherence, all but the bonding tape 24 is removed, as illustrated in FIGS. 14B and 14C. As removal means, a blade is inserted from the side of the bonding base tape 24' to form a cut 53, and an outside of the portion surrounded by the cut 53 is pulled and removed. A length and a shape of the portion to be removed can be determined by a size and a shape of the cutting blade. The portion to be removed can be continuously formed by inserting the cut 53 continuously with the cutting blade.

It should be noted that, when the thin base material tape 23 and the bonding base tape 24' are temporarily adhered, the base material tape 23 and the bonding base tape 24' are preferably bonded by temporary adherence as mentioned above. This temporary adherence makes it possible to, after the thin base material tape 23 and the bonding base tape 24' are bonded overlapping, easily peel the tape by adjusting the pressure and/or heating temperature applied. Further, after the bonding tape 24 is fabricated by temporary adherence, the thin base material tape 23 and the bonding tape 24 can be fully adhered by applying pressure and/or heating.

Figure 15A:
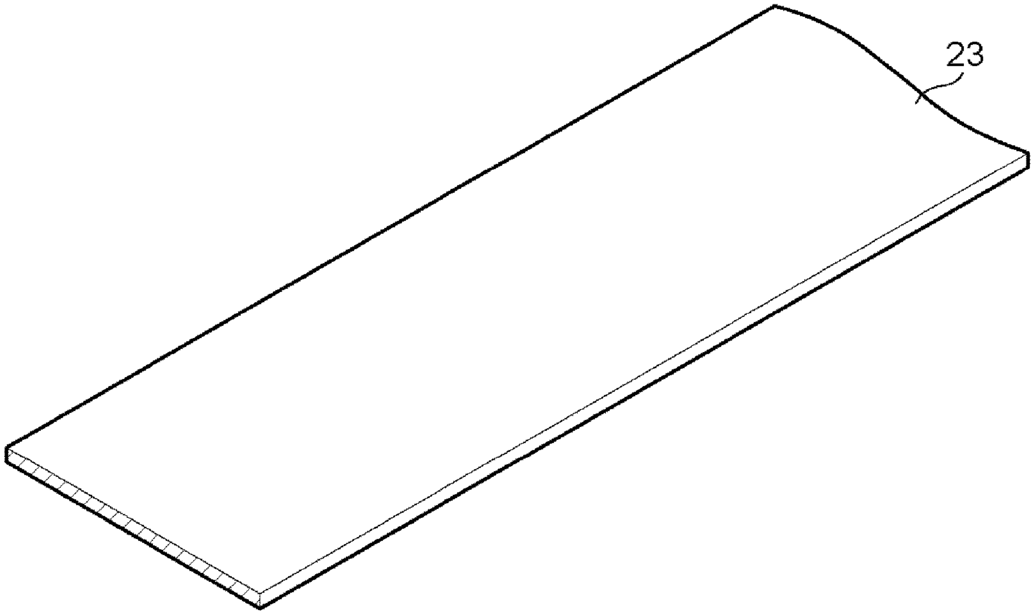
FIGS. 15A to 15C are process views illustrating another example of the method of manufacturing the variable-thickness insulating tape according to the present invention.
Figure 15B:
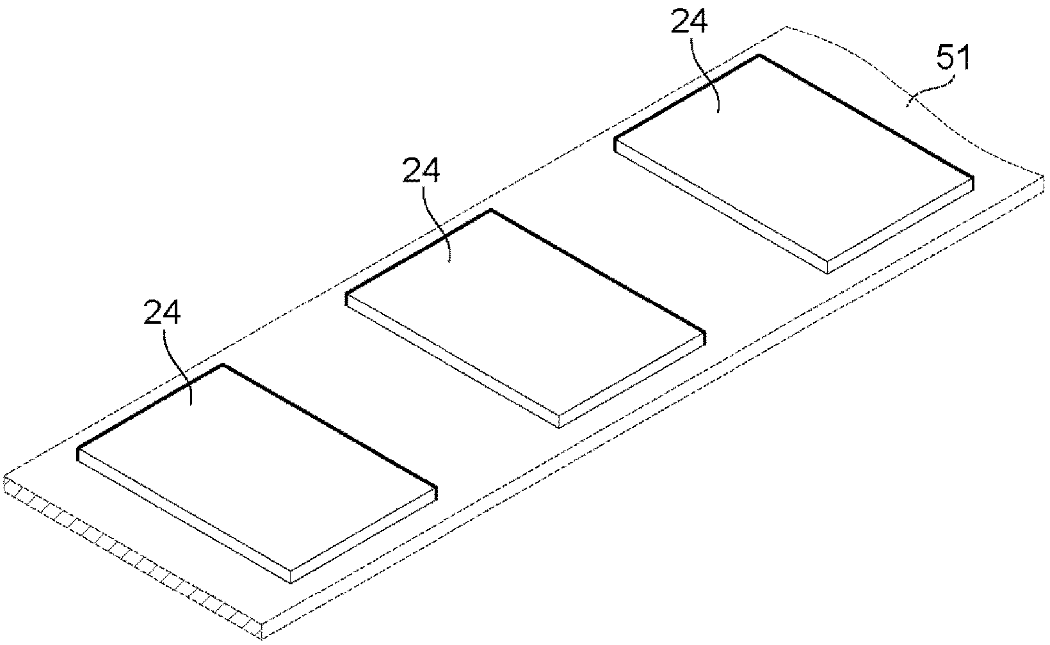
Figure 15C:
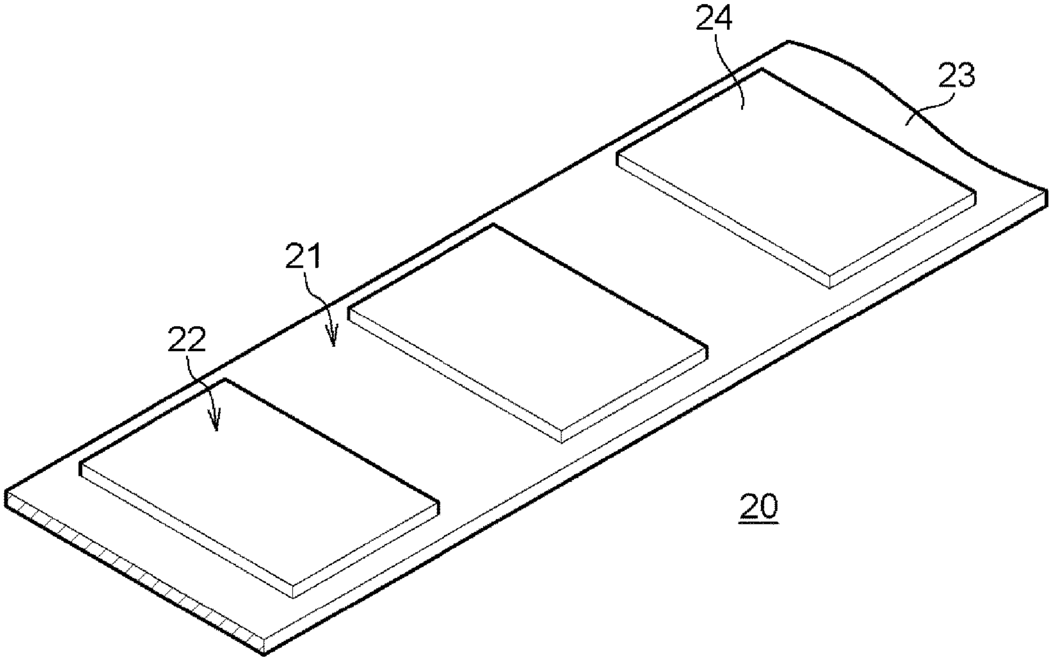

(b) The method illustrated in FIGS. 15A to 15C is a method of bonding the bonding tape 24 serving as the thick portion 22 formed into a predetermined shape on the thin base material tape 23. First, as illustrated in FIG. 15A, the base material tape 23 is prepared. Next, as illustrated in FIG. 15B, a plurality of the bonding tapes 24 of a predetermined size are prepared, or a plurality of the bonding tapes 24 are prepared by being bonded onto a process tape 51 by a desired light adhesive means. It should be noted that the process tape 51 is indicated by a dashed line, which means that use of the process tape 51 is optional. Lastly, as illustrated in FIG. 15C, a plurality of the bonding tapes 24 are directly bonded onto the base material tape 23 by a desired adhering means at a predetermined interval.

Figure 16A:
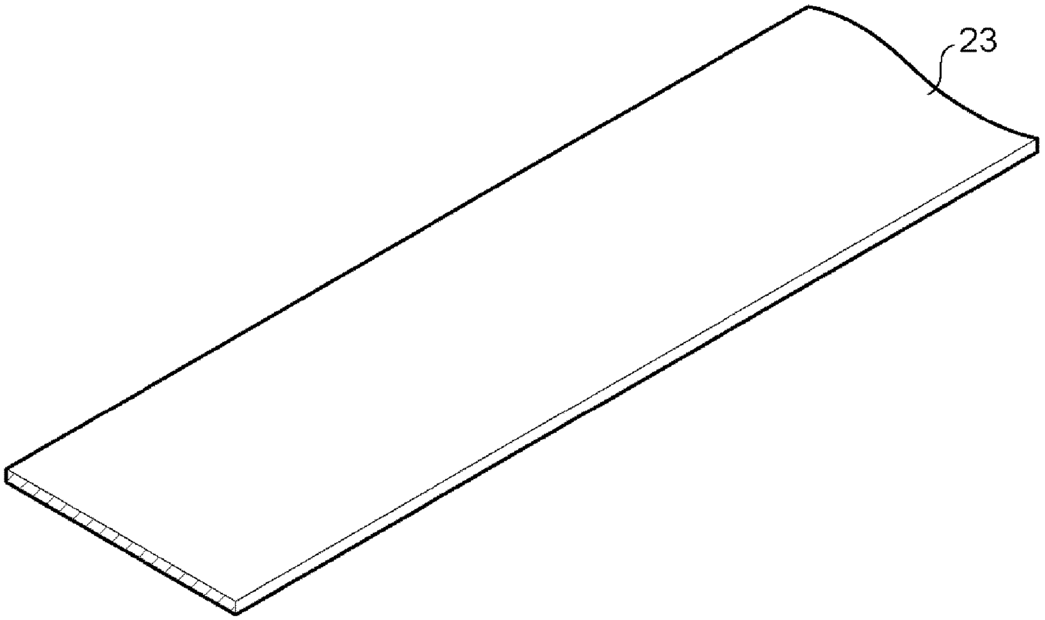
FIGS. 16A to 16C are process views illustrating yet another example of the method of manufacturing the variable-thickness insulating tape according to the present invention.
Figure 16B:
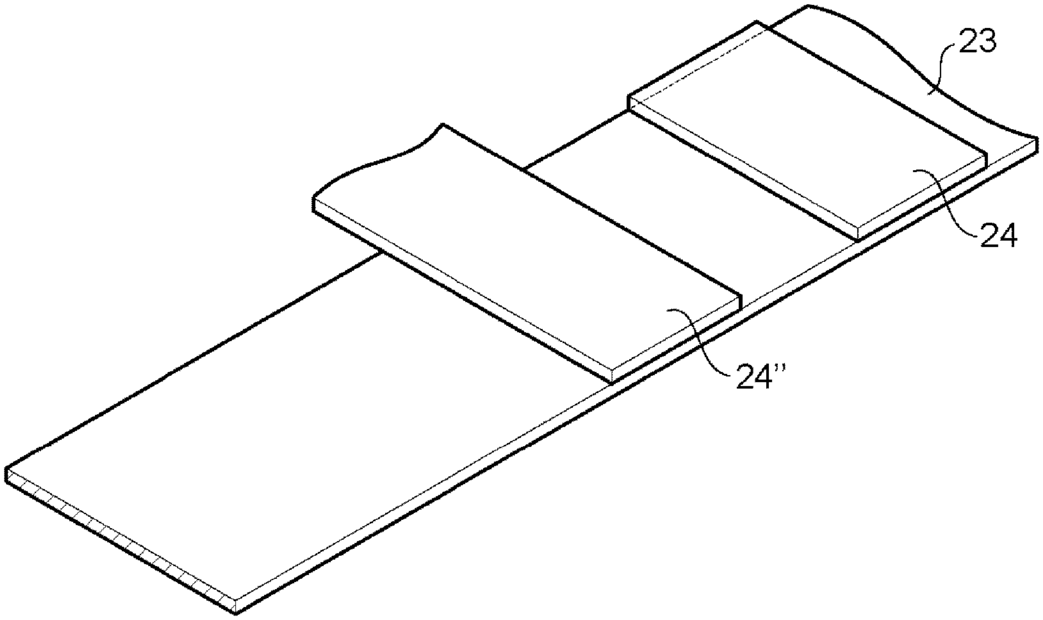
Figure 16C:
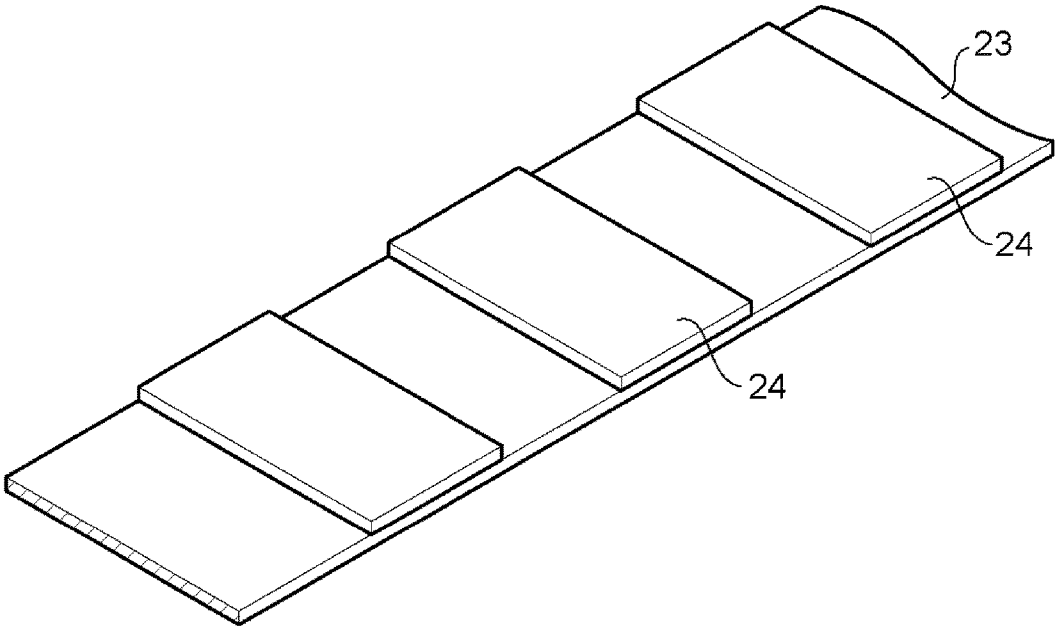

(c) The method illustrated in FIGS. 16A to 16C is a method of bonding a slit bonding tape 24" serving as the thick portion 22 slit to a predetermined width to the base material tape 23 serving as the thin portion and cutting the bonding tape 24" thus bonded, or simultaneously cutting the bonding tape 24" with a heating press that performs bonding. First, as illustrated in FIG. 16A, the base material tape 23 is prepared. Next, as illustrated in FIG. 16B, the bonding tape 24" slit to a predetermined width is prepared and bonded up to a position matching the width of the base material tape 23, with a predetermined length repeated in the width direction of the base material tape 23. Lastly, as illustrated in FIG. 16C, the slit bonding tape 24" is directly bonded onto the base material tape 23 at a predetermined interval and then cut, or simultaneously cut with a heating press that performs bonding.

(d) The method illustrated in FIGS. 17A to 17E is a method of bonding the bonding base tape 24' serving as the thick portion 22 onto the process tape 51, removing the bonding base tape 24' in a predetermined shape, using a remaining portion of the bonding base tape 24' as the bonding tape 24 (thick portion 22), bonding the thin base material tape 23 onto the bonding tape 24 serving as the thick portion 22, and lastly removing the process tape 51.

Figure 17A:
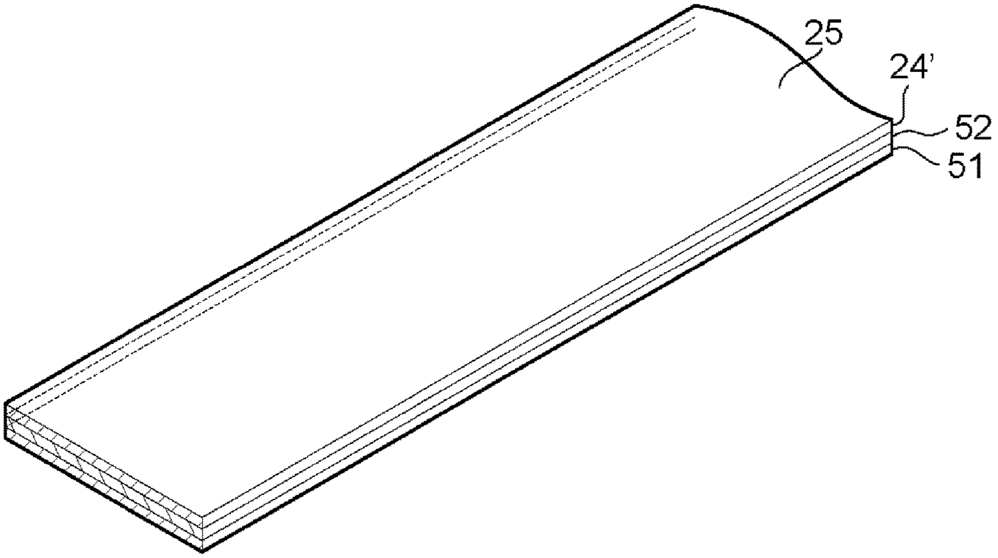
FIGS. 17A to 17E are process views illustrating yet another example of the method of manufacturing the variable-thickness insulating tape according to the present invention.

In this method, first, as illustrated in FIG. 17A, the process tape 51 is prepared, and then the bonding base tape 24' is bonded onto the process tape 51 via an adhesive layer 52. The other surface of the bonding base tape 24' is preferably provided with the colored adhesive layer 25 from the perspective of visibility. Accordingly, the bonding base tape 24' is bonded to the process tape 51 in a mode in which the adhesive layers 52, 25 are provided on both surfaces. The process tape 51 does not constitute the variable-thickness insulating tape 20 according to the present invention and is only used in the manufacturing process, but may be provided as is as a protective release tape that is peeled during use. The process tape 51 used may be the same tape as that of the base material tape 23 or the like, or may be any other resin tape. A thickness of the process tape 51 is also not particularly limited as long as the thickness does not interfere with the manufacturing process. As for the adhesive layers 52, 25, the adhesive layer 52 on the process tape 51 side that is ultimately peeled preferably has a weaker adhesive strength than that of the adhesive layer 25 on the side bonded to the base material tape 23. The type of adhesive is selected from such a perspective.

Figure 17B:
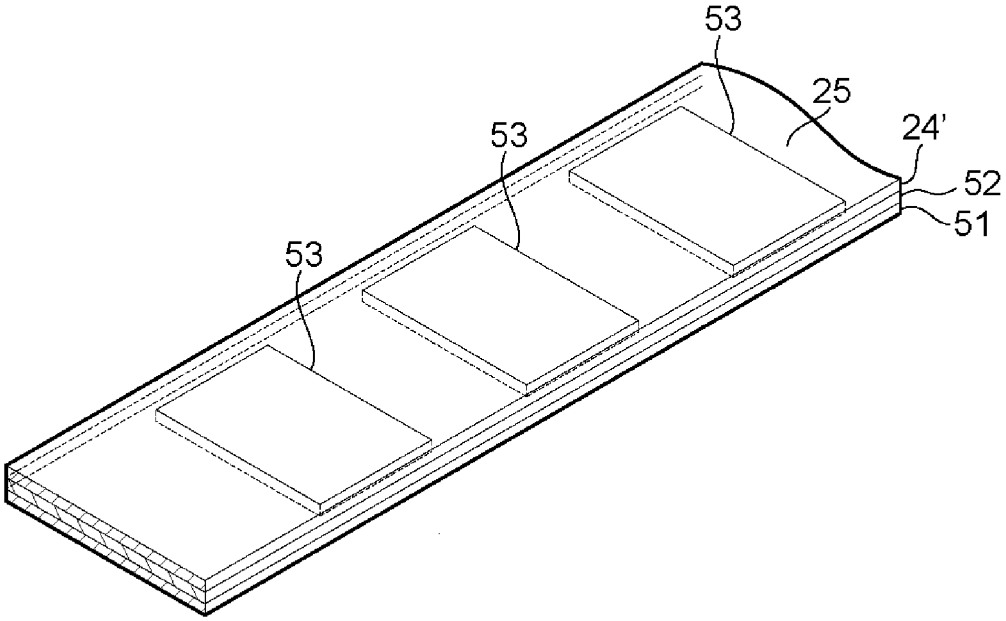
Figure 17C:
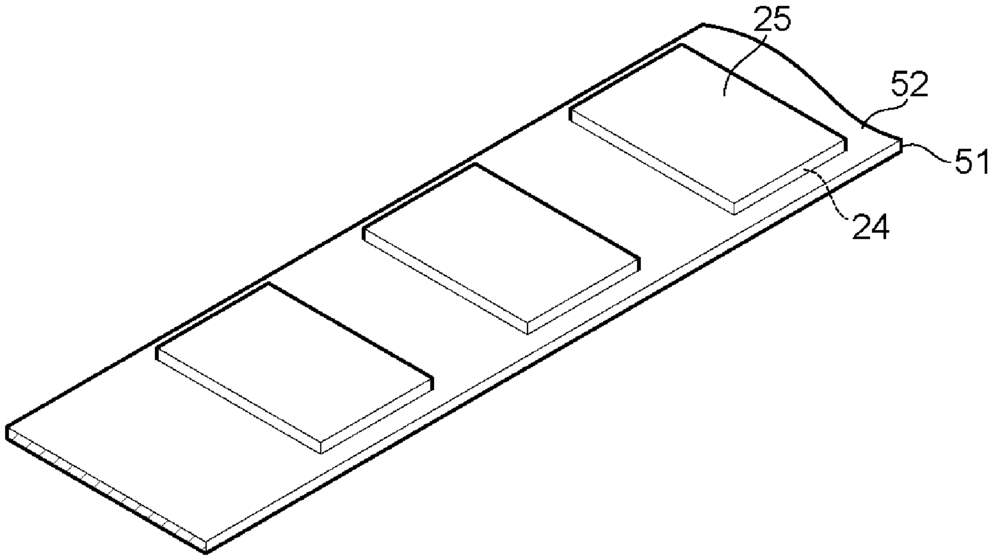

Next, as illustrated in FIGS. 17B and 17C, the bonding base tape 24' is temporarily adhered as in the method of temporary adherence illustrated in FIGS. 14A to 14C and subsequently removed in a predetermined shape, and then the remaining portion of the bonding base tape 24' is used as the bonding tape 24 (thick portion 22). As means thereof, as illustrated in FIG. 17B, a blade is inserted from the side of the bonding base tape 24' to form the cut 53 and, as illustrated in FIG. 17C, an outside of the portion surrounded by the cut 53 is pulled and removed. A length and a shape of the portion to be removed can be determined by a size and a shape of the cutting blade. The portion to be removed can be continuously formed by inserting the cut 53 continuously with the cutting blade.

Figure 17D:
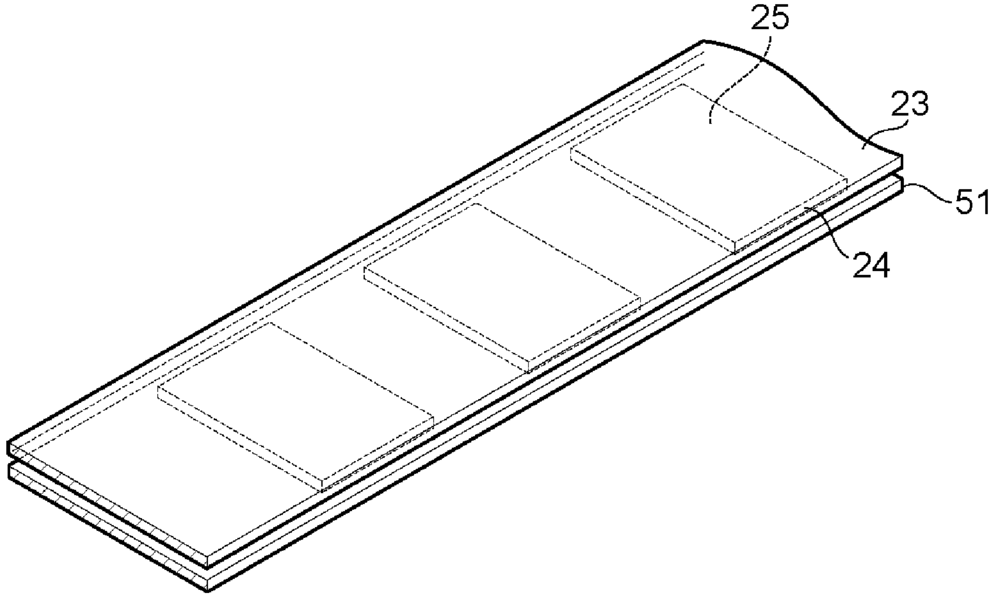

Next, as illustrated in FIG. 17D, the thin base material tape 23 is bonded onto the bonding tape 24 serving as the thick portion 22. The adhesive layer 25 is provided on the bonding tape 24, and thus the base material tape 23 can be bonded thereon and adhered by applying pressure and/or heating.

Figure 17E:
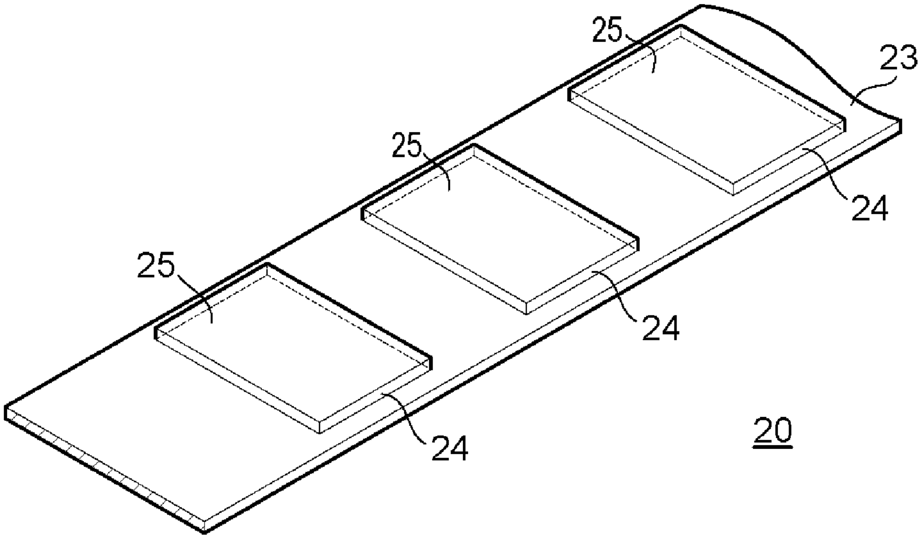

Lastly, as illustrated in FIG. 17E, the process tape 51 is removed. It should be noted that, as described above, the process tape 51 may be provided as is as a protective release tape that is peeled during use.

Figure 18A:
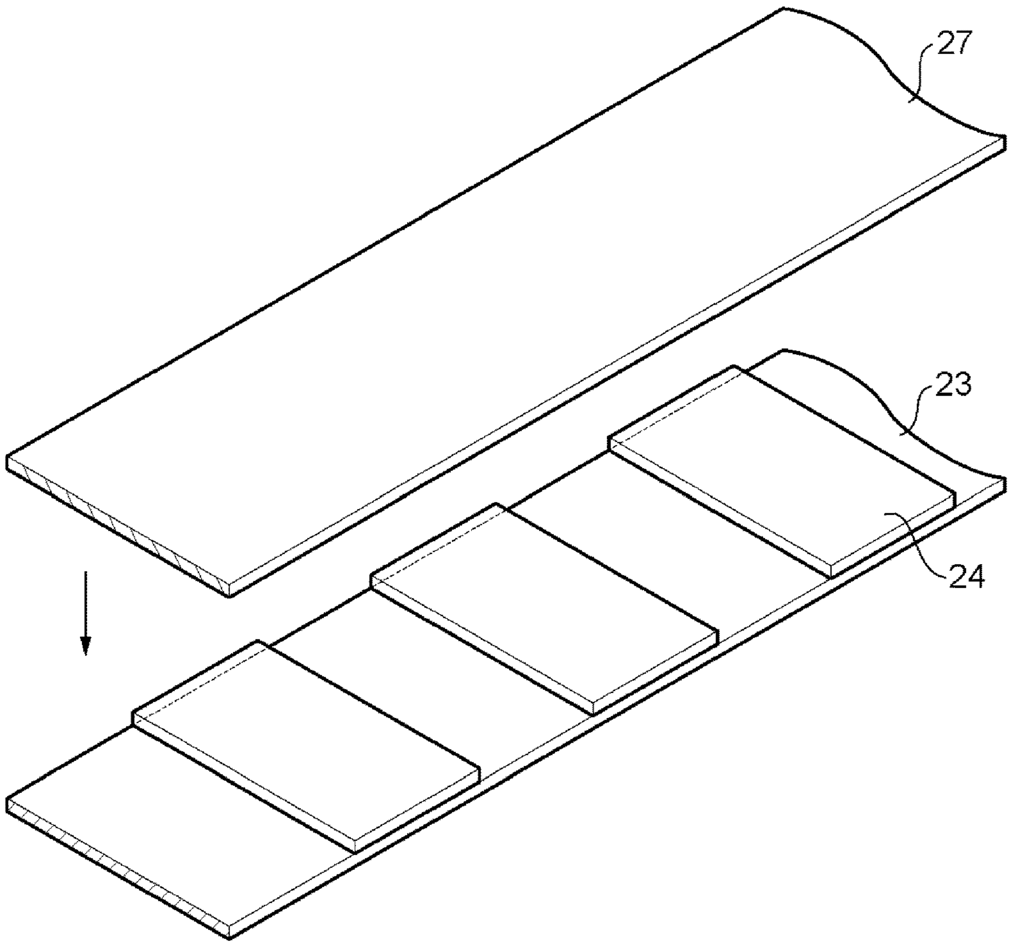
FIGS. 18A and 18B are process views illustrating yet another example of the method of manufacturing the variable-thickness insulating tape according to the present invention.
Figure 18B:
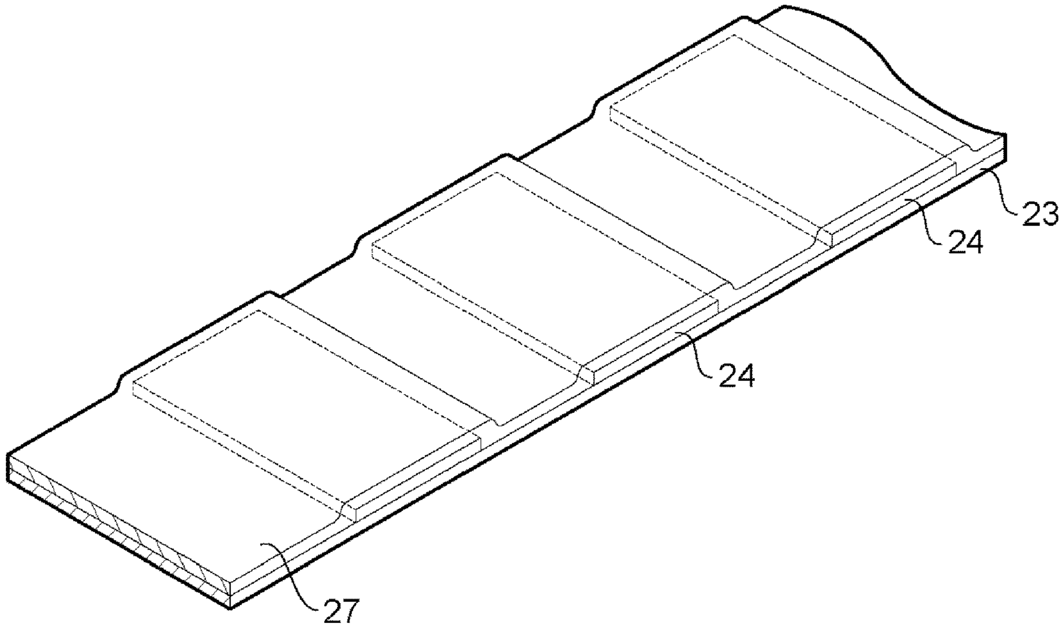

It should be noted that, in each of the above-described manufacturing methods (a) to (d), a process of bonding the cover tape 27 onto the bonding tape 24 serving as the thick portion 22 via the adhesive layer 25$a$ may be included. In this way, as illustrated in FIG. 4B and FIGS. 18A and 18B, it is possible to adopt a so-called sandwich structure constituted by the base material tape 23, the bonding tape 24 bonded onto the one main surface F1 of the base material tape 23 via the adhesive layer 25, and the cover tape 27 covering the bonding tape 24 in its entirety via the adhesive layer 25$a$.

As described above, the variable-thickness insulating tape 20 according to the present invention can fluctuate in tape thickness in a repetitive mode, and thus is preferably applicable to components and the like in which different characteristics are required at intervals. The variable-thickness insulating tape 20 manufactured by the above-described methods (a) to (d) or the like can be bonded to parts and members, for example, the strength or insulation of the thick portion 22 can be increased compared to the thin portion 21, and usage in various applications can be expected. Moreover, this method has an effect of not requiring man-hours or complex tasks. The manufactured tape can be distributed and sold as a rolled tape roll.

EXAMPLES

The present invention will now be described in further detail through examples. The present invention is not limited to the following examples, and those skilled in the art may make various changes, modifications, and alterations within the scope of the present invention.

Example 1

The insulated wire of Example 1 is the insulated wire 10A of the first embodiment illustrated in FIG. 5, and is the insulated wire 10A obtained by winding the variable-thickness insulating tape 20 illustrated in FIG. 4A on the outer periphery of a copper wire having a diameter of 1.0 mm. Here, a configuration is adopted in which the tape part 22 of the insulated wire 10A is colored.

The variable-thickness insulating tape 20 is a tape obtained by bonding the bonding tape 24 having a thickness of 25 μm and a length of 65 mm to the base material tape 23 having a thickness of 12 μm at an interval of 40 mm via the colored adhesive layer 25 having a thickness of 2 μm. The adhesive layer 26 is provided on the main surface F1 of the variable-thickness insulating tape 20 on the bonding tape surface side S1. The variable-thickness insulating tape 20 is wrapped around the conductor 1 by a half wrap (½ wrap) with the bonding tape surface side S1 being on the conductor 1 side.

In the obtained insulated wire 10A, the tape part 21 serving as the thin insulating coating 2 has a total average thickness of 23 μm including the adhesive layer 26, and the colored tape part 22 serving as the thick insulating coating 3 has a total average thickness of 62 μm including the colored adhesive layer 25 and the adhesive layer 26. The obtained insulated wire 10A has an average diameter of 1.12 mm in a portion in which the insulating coating is thick, and an average diameter of 1.05 mm in a portion in which the insulating coating is thin. The thicknesses and the average diameters are shown in Table 1. By being wound around the conductor 1 with a protruding portion of the bonding tape surface side S1 being on the inside, a surface of the insulated wire 10A becomes a smooth surface, and this is more preferable in a case of use with the insulating coating wrapped around a coil. At this time, an average diameter difference between the portion of the thick insulating coating 3 and the portion of the thin insulating coating 2 of the insulated wire 10A is 0.07 mm and thus, although identification of the insulating coatings 2, 3 is visibly difficult, the thick insulating coating 3 is colored as in this example, thereby making it possible to easily identify the portion of the thick insulating coating 3 and the portion of the thin insulating coating 2 by the different visibilities of the insulating coatings 2, 3.

Example 2

The insulated wire of Example 2 is the insulated wire 10B of the second embodiment illustrated in FIG. 6, and is the insulated wire 10B obtained by winding the variable-thickness insulating tape 20 illustrated in FIG. 4A and the constant-thickness insulating tape 30 on the outer periphery of a copper wire having a diameter of 1.0 mm. Here, a configuration is adopted in which the tape part 22 of the insulated wire 10B is colored.

The variable-thickness insulating tape 20 is a tape obtained by bonding the colored bonding tape 24 having a thickness of 25 μm and a length of 65 mm to the base material tape 23 having a thickness of 12 μm at an interval of 40 mm via the colored adhesive layer 25 having a thickness of 2 μm. The adhesive layer 26 is provided on the main surface F2 of the variable-thickness insulating tape 20 on the flat surface side S2 of the base material tape. The variable-thickness insulating tape 20 is wrapped in two layers around the conductor 1 by a half wrap (½ wrap) with the bonding tape surface side S1 being on the conductor 1 side. The constant-thickness insulating tape 30 is a transparent tape provided with an adhesive layer having a thickness of 2 μm on a tape having a thickness of 9 μm. This constant-thickness insulating tape 30 is wrapped in a winding direction opposite to that of the variable-thickness insulating tape 20 by ⅓ wrap with the side of the adhesive layer being on the inside.

In the obtained insulated wire 10B, the tape part 21 serving as the thin insulating coating 2 has a total average thickness of 40 μm including the adhesive layer 26, and the tape part 22 serving as the colored thick insulating coating 3 has a total average thickness of 78 μm including the colored adhesive layer. The obtained insulated wire 10B has an average diameter of 1.16 mm in a portion in which the insulating coating is thick, and an average diameter of 1.08 mm in a portion in which the insulating coating is thin. The thicknesses and the average diameters are shown in Table 1. At this time, the color of the colored tape part 22 serving as the thick insulating coating 3 can be identified through the transparent constant-thickness insulating tape 30. With the thick insulating coating 3 being colored, the insulating coatings 2, 3 have different visibilities, thereby making it possible to easily identify the portion of the thick insulating coating 3 and the portion of the thin insulating coating 2.

Example 3

The insulated wire of Example 3 is the insulated wire 10C of the third embodiment illustrated in FIG. 7, and is the insulated wire 10C obtained by winding the variable-thickness insulating tape 20 illustrated in FIG. 4A on an outer periphery of a copper wire having a diameter of 1.0 mm. Here, a configuration is adopted in which the tape part 22 of the insulated wire 10C is colored.

The variable-thickness insulating tape 20 is a tape obtained by bonding the colored bonding tape 24 having a thickness of 25 μm and a length of 65 mm to the base material tape 23 having a thickness of 12 μm at an interval of 40 mm via the colored adhesive layer 25 having a thickness of 2 μm. In the variable-thickness insulating tape 20A initially wound, the adhesive layer 26 is provided on the flat surface side S2 of the base material tape. In the variable-thickness insulating tape 20B wound thereon, the adhesive layer 26 is provided on the bonding tape surface side S1. The variable-thickness insulating tape 20A is wrapped in two layers around the conductor 1 by a half wrap (½ wrap) with the base material tape 23 side being on the conductor 1 side. The variable-thickness insulating tape 20B wound in the opposite direction thereon is wrapped around the conductor 1 by winding in a winding direction opposite to that of the variable-thickness insulating tape 20A by ⅓ wrap with the bonding tape surface side S1 being on the conductor 1 side.

In the obtained insulated wire 10C, the tape part 21 serving as the thin insulating coating 2 has a total average thickness of 43 μm including the adhesive layer, and the colored tape part 22 serving as the thick insulating coating 3 has a total average thickness of 113 μm including the adhesive layer. The obtained insulated wire 10C has an average diameter of 1.23 mm in a portion in which the insulating coating is thick, and an average diameter of 1.09 mm in a portion in which the insulating coating is thin. The thicknesses and the average diameters are shown in Table 1. At this time, the tape part 22 is colored, thereby making it possible to identify the thick insulating coating 3 portion, and easily identify the portion of the thick insulating coating 3 and the portion of the thin insulating coating 2.

Example 4

The insulated wire 10D of Example 4 is the insulated wire 10D of the fourth embodiment illustrated in FIG. 8, and is the insulated wire 10D obtained by winding the variable-thickness insulating tape 20 and the constant-thickness insulating tape 30 on the outer periphery of a copper wire having a diameter of 1.0 mm. Here, a configuration is adopted in which the tape part 22 of the insulated wire 10D is colored.

The variable-thickness insulating tape 20 is a tape obtained by bonding the colored bonding tape 24 having a thickness of 25 μm and a length of 65 mm to the base material tape 23 having a thickness of 12 μm at an interval of 40 mm via the colored adhesive layer 25 having a thickness of 2 μm. The adhesive layer 26 is provided on the flat surface side S2 of the base material tape of the variable-thickness insulating tape 20. The variable-thickness insulating tape 20 is wrapped in three layers around the conductor 1 by ⅔ wrap with the base material tape 23 side being on the conductor 1 side. The constant-thickness insulating tape 30 is a tape provided with an adhesive layer having a thickness of 2 μm on a tape having a thickness of 9 μm. This constant-thickness insulating tape 30 is wrapped in a winding direction opposite to that of the variable-thickness insulating tape 20 by ⅓ wrap with the side of the adhesive layer being on the inside.

In the obtained insulated wire 10D, the tape part 21 serving as the thin insulating coating 2 has a total average thickness of 61 μm including the adhesive layer, and the colored tape part 22 serving as the thick insulating coating 3 has a total average thickness of 133 μm including the adhesive layer. The obtained insulated wire 10D has an average diameter of 1.27 mm in a portion in which the insulating coating is thick, and an average diameter of 1.12 mm in a portion in which the insulating coating is thin. The thicknesses and the average diameters are shown in Table 1. At this time, it possible to identify the colored tape part 22 serving as the thick insulating coating 3 through the transparent constant-thickness insulating tape 30, and easily identify the portion of the thick insulating coating 3 and the portion of the thin insulating coating 2.

Example 5

An insulated wire of Example 5 is the same as the insulated wire 10C of the third embodiment illustrated in FIG. 7 as in Example 3, but in Example 5, the variable-thickness insulating tape 20 is thinner than that in Example 3. The average thicknesses and the average diameters are shown in Table 1.

Example 6

An insulated wire of Example 6 is, after fabrication of the insulated wire 10A of the first embodiment illustrated in FIG. 5 as in Example 1, provided with an extruded resin layer composed of ETFE resin on an outer periphery thereof as an insulating outer coating. The average thicknesses and the average diameters are shown in Table 1.

Example 7

An insulated wire of Example 7 is the insulated wire 10B of the second embodiment illustrated in FIG. 6 as in Example 2, but the variable-thickness insulating tape 20 having the so-called sandwich structure illustrated in FIG. 4B is used as the variable-thickness insulating tape 20. Here, a configuration is adopted in which the tape part 22 of the insulated wire 10B is colored.

The variable-thickness insulating tape 20 having this sandwich structure is constituted by the base material tape

23 having a thickness of 6 μm, the colored bonding tape 24 having a thickness of 25 μm bonded onto the base material tape 23 via the colored adhesive layer 25 having a thickness of 2 μm, and the cover tape 27 having a thickness of 6 μm covering the bonding tape 24 in its entirety via the adhesive layer 25*a* having a thickness of 2 μm. The constant-thickness insulating tape 30 is a transparent tape provided with an adhesive layer having a thickness of 2 μm on a tape having a thickness of 9 μm. This constant-thickness insulating tape 30 is wrapped in a winding direction opposite to that of the variable-thickness insulating tape 20 by ⅓ wrap with the side of the adhesive layer being on the inside.

This insulated wire has a total average thickness of 43 μm in the thin portion and a total average thickness of 81 μm in the thick portion. The thicknesses and the average diameters are shown in Table 1. At this time, the color of the colored tape part 22 serving as the thick insulating coating 3 can be identified through the transparent constant-thickness insulating tape 30. Thus, the portion of the thick insulating coating 3 and the portion of the thin insulating coating 2 can be easily identified.

Comparative Examples 1 and 2

Comparative Example 1 is an enameled wire with a baked film of varnish having an insulating coating thickness of 0.04 mm. Comparative Example 2 is two pieces of the same constant-thickness insulating tape 30 as that used in Example 2, each wound by ½ wrap in opposite directions. The thicknesses and the outer diameters are shown in Table 1.

[Measurement of Partial Discharge Starting Voltage]

The partial discharge voltages of each insulated wire in Examples 1 to 7 and Comparative Examples 1 and 2 were measured. Each sample was formed into the two-piece twisted shape of JIS C3216-5, and the partial discharge voltage was measured by an XT-350PB39b manufactured by Adphox Co., Ltd, in accordance with IEC60034-18. The results are shown in Table 1.

TABLE 1

| | Insulation Structure | | Thickness (μm) | Total Thickness (μm) | Average Diameter (mm) | Partial Discharge Starting Voltage (kv) |
|---|---|---|---|---|---|---|
| Comparative Example 1 | Enamel | | 40 | 40 | — | 0.65 |
| Comparative Example 2 | | Tape 30 | 25 | 40 | 1.05 | 0.72 |
| | | Tape 30 | 15 | | 1.08 | |
| Example 1 | Thin portion | Tape 20 | 23 | 23 | 1.05 | 0.56 |
| | Thick portion | Tape 20 | 62 | 62 | 1.12 | 0.88 |
| Example 2 | Thin portion | Tape 20 | 23 | 40 | 1.05 | 0.72 |
| | | Tape 30 | 17 | | 1.08 | |
| | Thick portion | Tape 20 | 62 | 78 | 1.12 | 1.00 |
| | | Tape 30 | 16 | | 1.16 | |
| Example 3 | Thin portion | Tape 20 | 23 | 43 | 1.05 | 0.74 |
| | | Tape 30 | 17 | | 1.09 | |
| | Thick portion | Tape 20 | 62 | 113 | 1.12 | 1.22 |
| | | Tape 30 | 51 | | 1.23 | |
| Example 4 | Thin portion | Tape 20 | 45 | 61 | 1.09 | 0.88 |
| | | Tape 30 | 16 | | 1.12 | |
| | Thick portion | Tape 20 | 119 | 133 | 1.24 | 1.53 |
| | | Tape 30 | 14 | | 1.27 | |
| Example 5 | Thin portion | Tape 20 | 18 | 35 | 1.04 | 0.68 |
| | | Tape 30 | 17 | | 1.07 | |
| | Thick portion | Tape 20 | 44 | 60 | 1.09 | 0.88 |
| | | Tape 30 | 16 | | 1.12 | |
| Example 6 | Thin portion | Tape 20 | 23 | 73 | 1.05 | 0.97 |
| | | Extruded outer coating | 50 | | 1.15 | |
| | Thick portion | Tape 20 | 50 | 100 | 1.10 | 1.13 |
| | | Extruded outer coating | 50 | | 1.20 | |
| Example 7 | Thin portion | Tape 20 | 27 | 43 | 1.05 | 0.74 |
| | | Tape 30 | 17 | | 1.09 | |
| | Thick portion | Tape 20 | 62 | 81 | 1.13 | 1.00 |
| | | Tape 30 | 16 | | 1.16 | |

*The tape 20 is the variable-thickness insulating tape 20.
The tape 30 is the constant-thickness insulating tape 30.

[Evaluation Results]

In the insulated wire of Example 1, the thin portion of the insulating coating is thinner than the coatings of the insulated wires of Comparative Examples 1 and 2, the thick portion of the insulating coating is approximately 1.5 times that of the coatings of the insulated wires of Comparative Examples 1 and 2, and the partial discharge starting voltage increased by 35% with respect to that of Comparative Example 1. In the insulated wire of Example 2, the thin portion of the insulating coating is the same as those of the coatings of the insulated wires of Comparative Examples 1 and 2, the thick portion of the insulating coating is approximately 2 times those of the coatings of the insulated wires of Comparative Examples 1 and 2, and the partial discharge starting voltage increased by 53% with respect to that of Comparative Example 1. In the insulated wire of Example 3, the thin portion of the insulating coating is substantially the same as those of the coatings of the insulated wire of Comparative Examples 1 and 2, the thick portion of the insulating coating is approximately 2.8 times those of the coatings of the insulated wires of Comparative Examples 1 and 2, and the partial discharge starting voltage increased by 87% with respect to that of Comparative Example 1. In the insulated wire of Example 4, the thin portion of the insulating coating is approximately 1.5 times those of the coatings of the insulated wire of Comparative Examples 1 and 2, the thick portion of the insulating coating is approximately 3.3 times those of the coatings of the insulated wire of Comparative Examples 1 and 2, and the partial discharge starting voltage increased by 135% with respect to that of Comparative Example 1. In the insulated wire of Example 5, the thin portion of the insulating coating is approximately 0.87 times those of the coatings of the insulated wires of Comparative Examples 1 and 2, the thick portion of the insulating coating is approximately 1.5 times those of the insulated wires of Comparative Examples 1 and 2, and the partial discharge starting voltage increased by 35% with respect to that of Comparative Example 1. In the insulated wire of Example 6, the thin portion of the insulating coating is approximately 1.8 times those of the coatings of the insulated wire of Comparative Examples 1 and 2, the thick portion of the insulating coating is approximately 2.5 times those of the coatings of the insulated wires of Comparative Examples 1 and 2, and the partial discharge starting voltage increased by 73% with respect to that of Comparative Example 1. In the insulated wire of Example 7, the thin portion of the insulating coating is substantially the same as those of the coatings of the insulated wires of Comparative Examples 1 and 2, the thick portion of the insulating coating is approximately 2 times those of the coatings of the insulated wires of Comparative Examples 1 and 2, and the partial discharge starting voltage increased by 54% with respect to that of Comparative Example 1.

On the other hand, the coating thickness of the insulated wire of Comparative Example 2 is substantially the same as that of the enameled wire with a baked film of varnish having a thickness of about 0.04 mm, which is typical tape-wound insulated wire and the insulated wire of Comparative Example 1. The insulated wire of Comparative Example 2 had about a 20% increase in partial discharge starting voltage compared to the insulated wire of Comparative Example 1.

As described above, it can be seen that the partial discharge starting voltage of the thick portion of the insulating coating is improved in Examples 1 to 7 compared to in Comparative Examples 1 and 2. This thick portion is adopted, for example, in the "crossing part" connecting the stator slot conductor part of the motor, thereby making it possible to increase the partial discharge starting voltage. In particular, for a coil using a fine wire with a conductor having a cross-sectional size of about 1.0 mm φ as in the examples, it is necessary to increase the adhesion of the insulating coating with respect to the conductor and the positioning accuracy of the thick portion of the insulating coating to accommodate the crossing part of the coil. In such a case, the insulated wire of the present invention, with different thicknesses of the insulating coating being repeatedly formed at predetermined intervals, can simplify processes during coil fabrication.

DESCRIPTIONS OF REFERENCE NUMERALS

1 Conductor
2 Thin insulating coating
3 Thick insulating coating
3*a* Tapered part
3*b* Main body part
10, 10A to 10D Insulated wire
19 Boundary line between thick region and thin region
20, 20A, 20B Variable-thickness insulating tape
21 Tape part (Thin portion)
22, 22*a*, 22*b*, 22*c* Tape part (Thick portion)
23 Base material tape
24 Bonding tape
24' Bonding base tape
24" Slit bonding tape
25 Adhesive layer
25*a* Adhesive layer
26 Adhesive layer
27 Cover tape
30 Constant-thickness insulating tape
31 Overwrapped part
32 Non-overwrapped part
A Thick region
B Thin region
F1 One main surface of base material tape
F2 Other main surface of base material tape
S1 Surface side of bonding tape
S2 Flat surface side of base material tape
L1, L2, L3 Length of thick portion in longitudinal direction
P1, P2, P3 Interval between thick portions
θ1 Winding angle of variable-thickness insulating tape with respect to longitudinal direction of conductor
θ2 Angle of boundary line between thick region and thin region with respect to longitudinal direction of variable-thickness insulating tape
θ3 Angle between boundary line of variable-thickness insulating tape and longitudinal direction of conductor
40 Coil configuration
E1 to E9 Circumferential conductive wire part
PS1 to PS10 Linear conductive wire part
E1M to E9M Circumferential conductive wire front part
KA1 to KA9 Non-step-formation part
E1N to E9N Circumferential conductive wire rear part
SS1, SS2 Bent end part
51 Process tape
52 Adhesive layer (Pressure-sensitive adhesive layer)
53 Cut

What is claimed is:

1. An insulated wire comprising:
a conductor; and
an insulating coating provided on an outer periphery of the conductor, the insulating coating comprising a thick insulating coating and a thin insulating coating being repeatedly provided at desired intervals, and
the thick insulating coating and the thin insulating coating are formed by a variable-thickness insulating tape comprising a thick region and a thin region at predetermined intervals being wound on the outer periphery of the conductor;
wherein the variable-thickness insulating tape further comprises:
at least one of a base material tape and a bonding tape bonded onto one main surface of the base material tape, or the base material tape and the bonding tape bonded onto the one main surface of the base material tape, and a cover tape further bonded onto the bonding tape so as to cover the bonding tape;
an adhesive layer formed on the one main surface of the base material tape and on the bonding tape or on the other main surface of the base material tape, wherein the variable-thickness insulating tape initially wound on the outer periphery of the conductor is wound with the adhesive layer being on the conductor side serving as an inside or on an outside; and a second variable-thickness insulating tape further provided on the variable-thickness insulating tape is wound with a second bonding tape surface side being on the inside and a second adhesive layer being on the inside.

2. The insulated wire according to claim 1, wherein the variable-thickness insulating tape is wound on the outer periphery of the conductor, another variable-thickness insulating tape or a constant-thickness insulating tape is further wound in a layer on an outer periphery of the second variable-thickness insulating tape, and the thick insulating coating and the thin insulating coating are repeated.

3. The insulated wire according to claim 1, wherein, in a case in which the variable-thickness insulating tape is wound and then the second variable-thickness insulating tape or a constant-thickness insulating tape is further wound in a layer on the variable-thickness insulating tape, the second variable-thickness insulating tape or the constant-thickness insulating tape is wound in a layer in a winding direction different from that of the variable-thickness insulating tape.

4. The insulated wire according to claim 1, wherein the thick insulating coating has a tapered part at both end parts thereof.

5. An insulated wire comprising:

a conductor; and an insulating coating provided on an outer periphery of the conductor, the insulating coating comprising a thick insulating coating and a thin insulating coating being repeatedly provided at desired intervals, and the thick insulating coating and the thin insulating coating are formed by a variable-thickness insulating tape comprising a thick region and a thin region at predetermined intervals being wound on the outer periphery of the conductor, wherein the variable-thickness insulating tape is wound on the outer periphery of the conductor, a second variable-thickness insulating tape or a constant-thickness insulating tape is further wound in a layer on an outer periphery of the variable-thickness insulating tape, and the thick insulating coating and the thin insulating coating are repeated, wherein, in a case in which the variable-thickness insulating tape is wound and then the second variable-thickness insulating tape is further wound on the variable-thickness insulating tape, the second variable-thickness insulating tape is wound in a layer so that a thick region thereof overlaps the thick insulating coating already formed.

6. An insulated wire comprising:

a conductor; and an insulating coating provided on an outer periphery of the conductor, the insulating coating comprising a thick insulating coating and a thin insulating coating being repeatedly provided at desired intervals, and the thick insulating coating and the thin insulating coating are formed by a variable-thickness insulating tape comprising a thick region and a thin region at predetermined intervals being wound on the outer periphery of the conductor, wherein the variable-thickness insulating tape further comprises at least one of a base material tape and a bonding tape bonded onto one main surface of the base material tape, or a base material tape, a bonding tape bonded onto one main surface of the base material tape, and a cover tape further bonded onto the bonding tape so as to cover the bonding tape, wherein, in a case in which the variable-thickness insulating tape is wound and then a second variable-thickness insulating tape or a constant-thickness insulating tape is further wound in a layer on the variable-thickness insulating tape, the second variable-thickness insulating tape or the constant-thickness insulating tape is wound in a layer in a winding direction different from that of the variable-thickness insulating tape wherein the thick insulating coating and the thin insulating coating are formed by the variable-thickness insulating tape, including the thick region and the thin region at a predetermined interval, being wound on the outer periphery of the conductor, and wherein the variable-thickness insulating tape has a boundary line between the thick region and the thin region obliquely formed with respect to a longitudinal direction of the variable-thickness insulating tape.

7. The insulated wire according to claim 6, wherein, given θ1 as a winding angle of the variable-thickness insulating tape with respect to the longitudinal direction of the conductor, θ2 as an angle of the boundary line between the thick region and the thin region with respect to the longitudinal direction of the variable-thickness insulating tape, and θ3 as an angle between the boundary line of the variable-thickness insulating tape and the longitudinal direction of the conductor, the θ1 is within a range from 10° to 60°, the θ2 is within a range from 10° to 90°, and the variable-thickness insulating tape is wound in a direction in which the θ2 is greater than the θ3.

8. The insulated wire according to claim 7, wherein the θ3 is 0°.

* * * * *